United States Patent
Hirose et al.

(10) Patent No.: US 9,556,966 B2
(45) Date of Patent: Jan. 31, 2017

(54) GAS SUPPLYING APPARATUS

(71) Applicant: FUJIKIN INCORPORATED, Osaka (JP)

(72) Inventors: Takashi Hirose, Osaka (JP); Michio Yamaji, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 227 days.

(21) Appl. No.: 14/231,338

(22) Filed: Mar. 31, 2014

(65) Prior Publication Data
US 2014/0299201 A1 Oct. 9, 2014

Related U.S. Application Data

(63) Continuation-in-part of application No. PCT/JP2012/006140, filed on Sep. 26, 2012.

(30) Foreign Application Priority Data

Sep. 30, 2011 (JP) ................................. 2011-217169

(51) Int. Cl.
*F16K 11/20* (2006.01)
*F16K 27/00* (2006.01)

(52) U.S. Cl.
CPC ........ *F16K 27/003* (2013.01); *Y10T 137/4259* (2015.04); *Y10T 137/86485* (2015.04);
(Continued)

(58) Field of Classification Search
CPC ................ Y10T 137/87249; Y10T 137/87684; Y10T 137/87885; F16K 27/003; F15B 13/0817
(Continued)

(56) References Cited

U.S. PATENT DOCUMENTS 4,082,324 A * 4/1978 Obrecht .............. F15B 13/0814
137/271
5,441,076 A * 8/1995 Moriya ................ G05D 7/0635
137/486
(Continued)

FOREIGN PATENT DOCUMENTS

JP 05-172265 A 7/1993
JP 9-303308 A 11/1997
(Continued)

OTHER PUBLICATIONS

International Search Report issued in corresponding application PCT/JP2012/06140, completed Oct. 11, 2012 and mailed Oct. 23, 2012.

*Primary Examiner* — Reinaldo Sanchez-Medina
(74) *Attorney, Agent, or Firm* — Griffin and Szipl PC

(57) ABSTRACT

A gas supply line and gas supplying apparatus that facilitates maintenance and management of various types of devices. The supplying apparatus is formed with a supply line that is made up of a gas inlet-side block, a gas outlet-side block and a plurality of fluid control devices. The gas supplying apparatus is formed with at least two gas supply lines, the fluid control device of each gas supply line includes at least one flow controller, an inlet-side block of the flow controller on one gas supplying line is connected to an inlet-side block of the flow controller on the other gas supply line so as to oppose the inlet-side block, and an outlet-side block of one flow controller is connected to an outlet-side block of the other flow controller so as to oppose the gas outlet-side block.

16 Claims, 17 Drawing Sheets

(52) U.S. Cl.
CPC .................. *Y10T 137/86493* (2015.04); *Y10T 137/87885* (2015.04)

(58) Field of Classification Search
USPC ........ 137/267, 270, 597, 602, 605, 606, 884
See application file for complete search history.

(56) References Cited

U.S. PATENT DOCUMENTS

| | | | |
|---|---|---|---|
| 5,605,179 A * | 2/1997 | Strong, Jr. ............ | F16K 27/003 137/240 |
| 5,975,112 A | 11/1999 | Ohmit et al. | |
| 5,983,933 A | 11/1999 | Ohmi et al. | |
| 6,868,867 B2 * | 3/2005 | Yamaji ................. | F16K 27/003 137/884 |
| 7,841,628 B2 * | 11/2010 | Tokuda .................. | F16L 39/00 137/884 |
| 8,794,267 B2 * | 8/2014 | Shareef ............. | H01L 21/67069 118/715 |
| 8,950,433 B2 * | 2/2015 | Manofsky, Jr. ......... | G05D 7/00 137/884 |
| 2001/0003287 A1 * | 6/2001 | Ohmi ................. | F15B 13/0817 137/884 |
| 2005/0284529 A1 * | 12/2005 | Iwabuchi ............ | F15B 13/0814 137/884 |
| 2006/0060253 A1 * | 3/2006 | Yoshida ................ | F16K 27/003 137/884 |
| 2006/0096533 A1 | 5/2006 | Mochizuki et al. | |
| 2006/0272721 A1 * | 12/2006 | Milburn ................ | F16K 27/003 137/884 |
| 2009/0205724 A1 * | 8/2009 | Brenner ................ | F15B 13/081 137/597 |
| 2009/0320754 A1 * | 12/2009 | Oya ...................... | C23C 16/455 118/715 |
| 2010/0096031 A1 * | 4/2010 | Okase ................... | F16K 27/003 137/613 |
| 2010/0132808 A1 * | 6/2010 | Nakata .................. | F16K 27/003 137/315.01 |
| 2010/0258207 A1 * | 10/2010 | Schnur ................ | F15B 13/0817 137/597 |
| 2013/0025718 A1 * | 1/2013 | Nagase ..................... | B01J 4/02 137/597 |
| 2013/0333768 A1 * | 12/2013 | Chandrasekharan ..................... | C23C 16/45544 137/238 |
| 2015/0075660 A1 * | 3/2015 | Inada ................... | F16K 27/003 137/884 |
| 2015/0292647 A1 * | 10/2015 | Le Pellec .............. | F16K 27/003 137/606 |

FOREIGN PATENT DOCUMENTS

| | | |
|---|---|---|
| JP | 10-205636 A | 8/1998 |
| JP | 2002-349797 A | 12/2002 |
| JP | 2003-086579 A | 3/2003 |
| JP | 2004-100889 A | 4/2004 |
| JP | 2004-183743 A | 7/2004 |
| JP | 2006-242222 A | 9/2006 |
| JP | 2006-330851 A | 12/2006 |
| JP | 2008-298180 A | 12/2008 |
| JP | 2009-290078 A | 12/2009 |

\* cited by examiner

FIG. 20
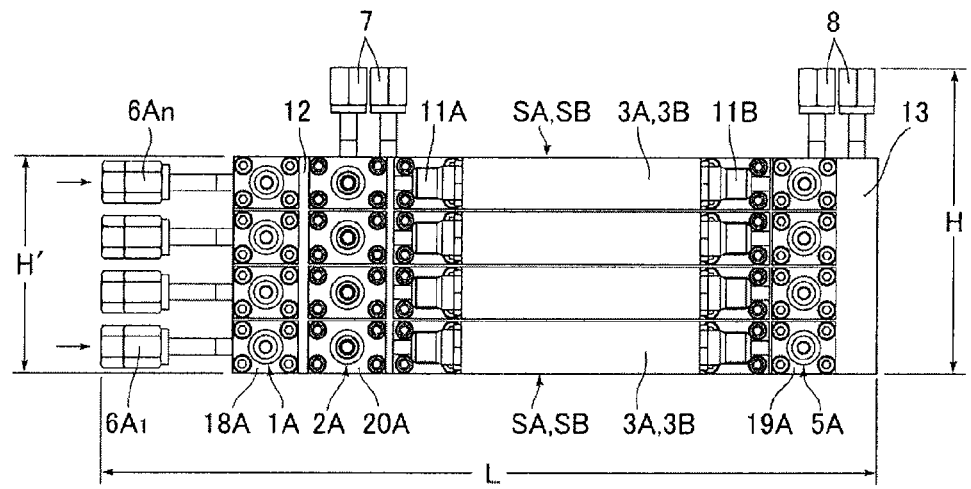
FIG. 21
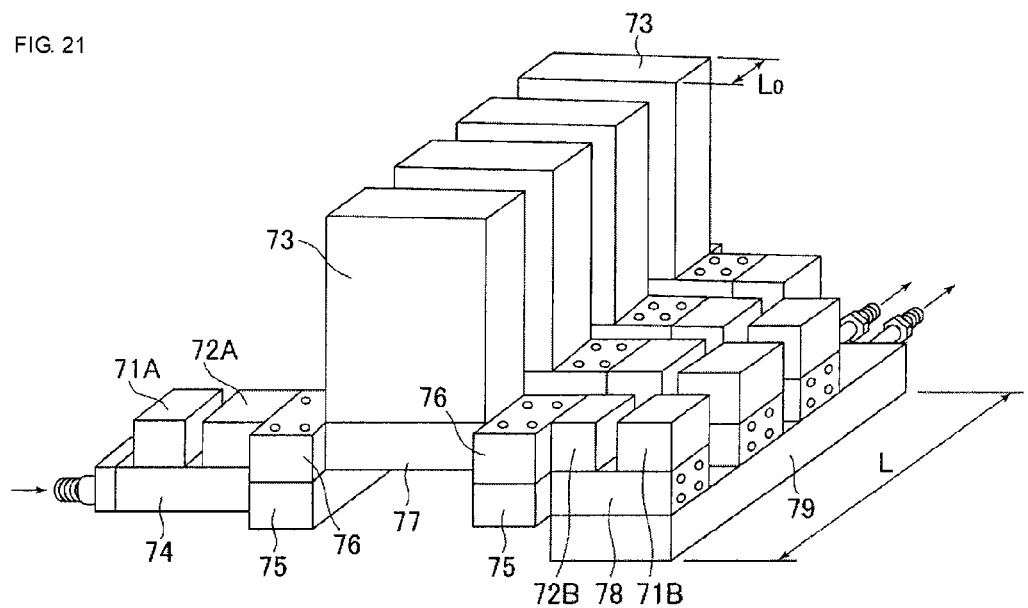
PRIOR ART
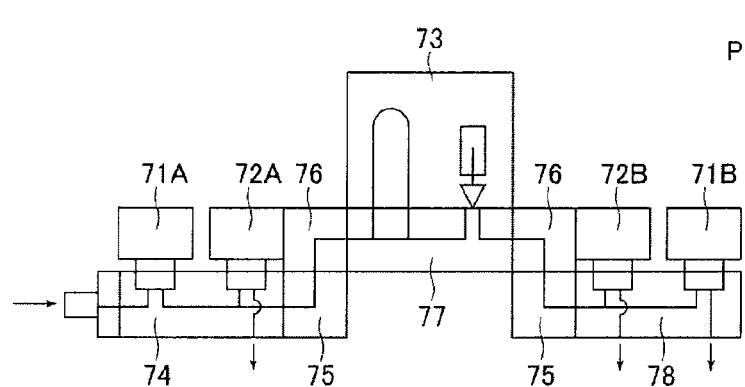

PRIOR ART

GAS SUPPLYING APPARATUS

This is a Continuation-In-Part Application in the United States of International Patent Application No. PCT/JP2012/006140 filed Sep. 26, 2012, which claims priority on Japanese Patent Application No. 2011-217169, filed Sep. 30, 2011. The entire disclosures of the above patent applications are hereby incorporated by reference.

BACKGROUND OF THE INVENTION

Technical Field

The present invention relates to an improvement in a gas supplying apparatus, for example, an integrated type gas supplying apparatus for semiconductor manufacturing equipment and relates to a gas supplying apparatus which can have a significantly increased number of gas supply lines, be downsized in dimensions and facilitate maintenance and inspection, etc., by further downsizing and making compact a pressure type flow control device and a thermal type flow control device used in the gas supplying apparatus.

Description of the Related Art

Conventionally, process gas has been supplied to semiconductor manufacturing equipment by using a so-called integrated type gas supplying apparatus.

FIG. 21 shows one example, in which two-way opening/closing valves 71A, 71B, three-way opening/closing valves 72A, 72B, a flow control device 73, etc., are integrated in a serial manner via block bodies 74, 75, 76, 77, 78, each of which has a gas flow passage, thereby forming one gas supplying line. And, the plurality of gas supplying lines are disposed and fixed in parallel via the block bodies 75, 79, thereby constituting an integrated type gas supplying apparatus (See, e.g., Japanese Published Unexamined Patent Application No. H05-172265, etc.).

The integrated type gas supplying apparatus shown in FIG. 21 described above has excellent characteristics, for example, fixing bolts for fixing various types of devices to block bodies can be removed from the upper side of the apparatus to easily replace control devices which form various gas supply lines and also to easily cope with addition of gas supply lines, etc.

However, an increase in the number of required gas supply lines will inevitably result in an increase in depth dimension L of an integrated type gas supplying apparatus. Thus, a problem arises in that an increase in dimensions of the gas supplying apparatus cannot be avoided.

In particular, the flow control device 73 has a certain structural limit in reducing a depth dimension thereof (thickness dimension) $L_0$. A thermal type flow control device (mass flow controller) requires a thickness dimension $L_0$ of at least 20 mm to 25 mm, and a pressure type flow control device requires a thickness dimension $L_0$ of 20 mm to 25 mm.

Therefore, as shown in FIG. 22, there has been developed such a device in which a depth dimension L1 of the block body 76 for fixing the flow control device 73 is made identical with the depth dimension $L_0$ (thickness dimension) of the flow control device 73. Furthermore, a clearance between the flow control devices 73 adjacent in parallel is made as small as possible and the flow control device 73 can be fixed by using a single fixing bolt 80 (See, e.g., Japanese Published Unexamined Patent Application No. 2008-298180).

However, as described above, the flow control device 73 has a limit in reducing the depth dimension (thickness dimension) $L_0$. Thus, an increase in the number of required gas supply lines will result in a dimensional increase in an integrated type gas supplying apparatus, making it difficult to substantially downsize the apparatus.

On the other hand, in recent years, in the field of semiconductor manufacturing equipment, semiconductor manufacturing processes have shifted to a so-called single substrate processing method. There have also been introduced a multiple chamber method in which one unit of semiconductor manufacturing equipment is provided with a plurality of process chambers to process a plurality of wafers all at once and a chamber multiple process method in which one process chamber is used to continuously perform a plurality of processes.

Therefore, a gas supplying apparatus is also strongly in demand with an increase in the number of gas supply lines according to an increase in the types of required supply gases. In actuality, there is a demand for an integrated type gas supplying apparatus which is capable of supplying 15 to 16 types of gases.

However, in view of reducing the costs associated with semiconductor manufacturing equipment and in particular in view of reducing the dimensions of expensive clean rooms, there has been a growing demand for reducing an installation space for the supplying apparatus. As a result, there is a demand for significant downsizing of the supplying apparatus. For example, in semiconductor manufacturing equipment employing a one-chamber multiple process method, there has been actual demand for an integrated type gas supplying apparatus equipped with 16 types of gas supply lines, the dimensions of which are 350 mm or less in width W, 250 mm or less in depth L and 250 mm or less in height H.

In an integrated type gas supplying apparatus, it is necessary to supply various types of special raw material gases to a process chamber instantly, at a predetermined flow rate and also in a completely clean state. It is, therefore, essential that the gas supplying apparatus can be managed for maintenance, in particular, various types of devices can be replaced and adjusted simply and easily, with no leakage at various connection portions.

Further, this type of gas supplying apparatus is required to be installed in general at an upper part of semiconductor manufacturing equipment, that is, between a ceiling part of the semiconductor manufacturing equipment and a ceiling part of the clean room. Therefore, in view of securing space necessary for maintenance and inspection, the integrated type gas supplying apparatus is required to keep its height dimension H and depth dimension L within about 250 mm and it is also required that various types of devices can be replaced, installed or adjusted, etc., from its side surface side of the apparatus.

CITATION LIST

Patent Document

Patent Document 1: Japanese Published Unexamined Patent Application No. H05-172265
Patent Document 2: Japanese Published Unexamined Patent Application No. 2008-298180
Patent Document 3: Japanese Published Unexamined Patent Application No. 2002-349797
Patent Document 4: Japanese Published Unexamined Patent Application No. 2004-100889

Patent Document 5: Japanese Published Unexamined Patent Application No. 2006-330851

SUMMARY OF THE INVENTION

Problems to be Solved by the Invention

The invention of the present application is to solve the above-described problems associated with conventional gas supplying apparatuses for semiconductor manufacturing equipment, etc. That is, in a conventional integrated type gas supplying apparatus which is formed so that various devices such as an inlet opening/closing valve, a three-way opening/closing valve for purge, a flow control device, an outlet opening/closing valve, etc., are coupled in a line (in a serial manner) to form a single gas supply line and such plurality of gas supply lines are disposed and fixed in parallel on a base plate, the flow controller is not allowed to be significantly reduced in thickness dimension $L_0$ in view of its structure. Thus, an increase in the number of gas supply lines to be integrated will increase the depth dimension L of the gas supplying apparatus. As a result, the gas supplying apparatus is increased in dimensions (width W×depth L×height H), resulting in a failure of meeting a demand for decreasing installation space, from the perspective of semiconductor manufacturing equipment, etc. The present invention is to solve the above-described problems, and, in particular, a structure of the flow controller itself and a combination structure of two flow controllers are improved to provide a gas supplying apparatus which is capable of easily meeting a demand for increasing the number of gas supply lines, significantly downsizing the gas supplying apparatus, facilitating maintenance and inspection, swiftly switching types of supply gases and attaining accurate flow rate control and stable supply of clean gas, etc.

Means for Solving the Problems

The inventors of the present application have so far manufactured and developed various integrated type gas supplying apparatuses for semiconductor manufacturing equipment and made them public. Subsequently, through the manufacture and development of these apparatuses, the inventors have come up with an idea that in place of a conventional system in which, as shown in FIG. 21, various devices such as an inlet opening/closing valve, a flow control device and an outlet opening/closing valve are arranged in a line (in a serial manner) to form a gas supply line for one type of gas and the plurality of gas supply lines are placed in parallel to supply a plural types of gases when viewed from above, gas supply lines, each of which corresponds to one type of gas, are placed so as to oppose each other when viewed from above and the plurality of gas supply lines placed so as to oppose each other are, as shown in FIG. 2, stacked and arrayed in parallel, when viewed from the front, to adopt an entirely new combination system, by which the integrated type gas supplying apparatus is reduced to about half in depth dimension L, as compared with a conventional apparatus (Embodiment 1).

Through the manufacture and development of various types of gas supplying apparatuses, the inventors of the present application have also come up with an idea that in a state that each of pressure type flow controllers or each of thermal type flow controllers installed on two gas supply lines are kept adjacent when viewed from above, these two gas supply lines are arranged in a line (in a serial manner) so as to be formed integrally, and the plurality of the thus integrally formed gas supply lines are, as shown in FIG. 7, stacked and arrayed in parallel, when viewed from the front, to adopt an entirely new combination system, by which the integrated type gas supply apparatus is reduced to about half in depth L, as compared with a conventional apparatus (Example 1 of Embodiment 2).

Still further, the inventors of the present application have come up with an idea that individual arithmetic control circuit substrates of two pressure type flow controllers used in Embodiment 2 are improved in combination and constitution, by which each of the flow controllers is significantly reduced in width dimension W and the integrated type gas supplying apparatus is further reduced in dimensions (Example 2 to Example 4 of Embodiment 2).

In addition, the inventors of the present application have come up with an idea that two integrated type gas supplying apparatuses according to Embodiment 2 are allowed to oppose each other in a width direction, combined and fixed in a line so as to constitute a unit body, and the plurality of the plurality of thus combined and fixed unit bodies are stacked and fixed in parallel in a direction of height H, by which the integrated type gas supplying apparatus is reduced to about one fourth in height H, as compared with a conventional apparatus (Embodiment 3).

The invention of the present application has been made based on the above-described ideas. The invention according to the first aspect is a gas supplying apparatus in which a gas supply line S is formed with a gas inlet-side block 12, a gas outlet-side block 13 and a plurality of fluid control devices, and the gas supplying apparatus is characterized in that at least two gas supply lines S are formed, the fluid control device of each of the gas supply lines S includes at least one flow controller 3, an inlet-side block 15 of the flow controller 3 on one line S is connected to an inlet-side block 15 of the flow controller 3 on the other gas supply line S so as to oppose the gas inlet-side block 12, and an outlet-side block 16 of one flow controller 3 is connected to an outlet-side block 16 of the other flow controller 3 so as to oppose the gas outlet-side block 13.

The invention according to the second aspect is the invention according to the first aspect which is characterized in that the gas inlet-side block 12 is provided with a purge gas passage 9 communicating between at least two gas supply lines S and the gas outlet-side block 13 is provided with a process gas passage 10 communicating between at least two gas supply lines S.

The invention according to the third aspect is the invention according to the first aspect or the second aspect which is characterized in that each of a plurality of fluid control devices includes an inlet opening/closing valve 1, a three-way switching opening/closing valve 2, a flow controller 3 and an outlet opening/closing valve 5.

The invention according to the fourth aspect is a gas supplying apparatus which places a plurality of gas supply lines S in parallel in which a process gas is allowed to be distributed through an inlet opening/closing valve 1, a three-way switching opening/closing valve 2, a flow controller 3 and an outlet opening/closing valve 5 and a purge gas is also allowed to flow-in through the three-way switching opening/closing valve 2, and the gas supplying apparatus which is characterized in that the opening/closing valves 1, 2, 5 are structured so as to respectively have main body blocks 18, 20, 19, the flow controller 3 is structured so as to have a main body block 14, a gas inlet-side block 12 and a gas outlet-side block 13, each of which is in the shape of a long/narrow rectangular column with height H' and has a gas distribution passage, are arrayed in parallel, with a space kept in a direction of depth L, the main body block 18 of the inlet opening/closing valve 1, the main body block 20 of the three-way switching opening/closing valve 2 and an inlet block 15 of the flow controller 3 which form one gas supply line S are fixed on one side surface of the inlet-side block 12 from one direction, and an outlet block 16 of the flow controller 3 and the main body block 19 of the outlet opening/closing valve 5 are fixed on one side surface of the outlet-side block 13 from one direction, with a space between individually opposing gas distribution passages kept airtight, thereby forming the one gas supply line S, and the other gas supply line S is formed so as to oppose the one gas supply line S on the other side surface of the gas inlet-side block 12 and that of the side surfaces of the gas outlet-side block 13.

The invention according to the fifth aspect is the invention according to the fourth aspect, in which the respective gas supply lines S, S which oppose each other are disposed and fixed in parallel at a plurality of stages, with a predetermined space kept in a direction of height H of the inlet-side block 12 and that of the outlet-side block 13.

The invention according to the sixth aspect is the invention according to the fourth aspect or the fifth aspect, in which the gas inlet-side block 12 is formed with a purge gas passage 9 which penetrates in a direction of height H, on both sides of the gas inlet-side block 12, there are formed gas passages 12D, 12D communicating between a process gas inlet joint 6 and the inlet opening/closing valve 1, gas passages 12A, 12B communicating between the inlet opening/closing valve 1 and the three-way switching opening/closing valve 2, gas passages 12A, 12B communicating between the three-way switching opening/closing valve 2 and the inlet block 15 of the flow controller 3, and gas passages 12C, 12C communicating between the purge gas passage 9 and the three-way switching opening/closing valve 2 so as to oppose each other, in addition, individual gas passages other than the purge gas passage 9 penetrating in a direction of height H are formed in parallel at a plurality of stages, with a predetermined space kept in a direction of height H of the gas inlet-side block 12.

The invention according to the seventh aspect is the invention according to the fourth aspect or the fifth aspect, in which a process gas passage 10 is formed which penetrates in a direction in height H of the gas outlet-side block 13, and on both sides of the gas outlet-side block 13 there are formed gas passages 13A, 13B communicating between the outlet block 16 of the flow controller 3 and the outlet opening/closing valve 5 and gas passages 13C, 13C communicating between the outlet opening/closing valve 5 and the process gas passage 10 so as to oppose each other, in addition, individual gas passages other than the process gas passage 10 penetrating in a direction of the height H are formed in parallel at a plurality of stages, with a predetermined space kept in a direction of height H of the gas outlet-side block 13.

The invention according to the eighth aspect is the invention according to any one of the fourth aspect to the seventh aspect, in which the flow controller 3 is a pressure type flow controller which uses a piezoelectric element driving control valve.

The invention according to the ninth aspect is the invention according to any one of the fourth aspect to the seventh aspect, in which valve chamber recessed parts 25 for the inlet opening/closing valve 1, the three-way switching opening/closing valve 2 and the outlet opening/closing valve 5 are formed at the gas inlet-side block 12 and the gas outlet-side block 13.

The invention according to the tenth aspect is the invention according to any one of the fourth aspect to the seventh aspect, in which the inlet opening/closing valve 1, the three-way switching opening/closing valve 2 and the outlet opening/closing valve 5 are structured so as to respectively have main body blocks 18, 20, 19, the flow controller 3 is structured so as to have a main body block 14, a gas inlet-side block 12 and a gas outlet-side block 13, each of which is in the shape of a long/narrow rectangular column with height H' and has a gas distribution passage, are arrayed in parallel, with a space kept in a direction of depth L, and the main body block 14 of the flow controller 3 is adapted so that a valve chamber recessed part 30 of the piezoelectric element driving control valve is installed on one side surface of a rectangular column-shaped block body and a pressure detector attachment recessed part is installed on the other side surface thereof, and the rectangular column-shaped block body is provided with a gas passage 37 communicating between the valve chamber recessed part 30 and the pressure detector attachment recessed part 31, a gas passage 36 communicating between the valve chamber recessed part 30 and the inlet block 15, a gas passage 38 communicating between the pressure detector attachment recessed part 31 and the outlet block 16, and an orifice 35 installed on the gas passage 38.

The invention according to the eleventh aspect is a gas supplying apparatus which places a plurality of gas supply lines S in parallel in which a process gas is allowed to be distributed sequentially through an inlet opening/closing valve 1, a three-way switching opening/closing valve 2, a flow controller 3 and an outlet opening/closing valve 5 and a purge gas is allowed to flow-in through the three-way switching opening/closing valve 2, and the gas supplying apparatus is characterized in that the flow controller 3 is structured so as to have a main body block 45, a gas inlet-side block 41 and a gas outlet-side block 42, each of which has a gas distribution passage, are arrayed in parallel, with a space kept in a direction of width W, process gas inlet joints 6, 6 and inlet opening/closing valves 1, 1 which form two gas supply lines S, S are fixed airtight on one side surface of the gas inlet-side block 41, three-way switching opening/closing valves 2, 2 which form two gas supply lines S, S are fixed airtight on the other side surface thereof, and outlet opening/closing valves 5, 5 which form two gas supply lines S, S are fixed airtight on one side surface of the gas outlet-side block 42, with a sealing member 24 installed between individual gas distribution passages which oppose each other, and the flow controller 3 is fixed on a side surface on the front surface side of each of the gas inlet-side block 41 and the gas outlet-side block 42 to form these two gas supply lines S, S.

The invention according to the twelfth aspect is the invention according to the eleventh aspect, in which the gas inlet-side blocks 41 and the gas outlet-side blocks 42 which support two gas supply lines S, S are disposed in parallel at a plurality of stages in a direction of height H, each of the gas inlet-side blocks 41 is fixed airtight on a purge gas passage block 43 which is formed in a rectangular column shape with height H' having a purge gas distribution passage 9 penetrated in a height direction, and each of the gas outlet-side blocks 42 is fixed airtight on a process gas passage block 44 which is formed in a rectangular column shape with height H' having a process gas passage 10 penetrated in a height direction, with the sealing member 24 inserted between individual gas passages which oppose each other.

The invention according to the thirteenth aspect is the invention according to the eleventh aspect or the twelfth aspect, in which on the gas inlet-side block 41, there are formed valve chamber recessed parts 25 of each of the inlet opening/closing valves 1 and each of the three-way switching opening/closing valves 2, and there are also formed gas passages 41a, 41a communicating between the process gas inlet 6 and the inlet opening/closing valve 2 of one gas supply line S and between the process gas inlet 6 and the inlet opening/closing valve 2 of the other gas supply line S, gas passages 41b, 41b communicating between each of the inlet opening/closing valves 1 and each of the three-way switching opening/closing valves 2, gas passages 41c, 41c communicating between each of the three-way switching opening/closing valves 2 and an inlet block 46 of the flow controller 3, and gas passages 41d, 41d communicating between each of the three-way switching opening/closing valves 2 and the purge gas passage 9 of the purge gas passage block 43.

The invention according to the fourteenth aspect is the invention according to the eleventh aspect or the twelfth aspect, in which on the gas outlet-side block 42, there are formed a valve chamber recessed part 25 of each of the outlet opening/closing valves 5, gas passages 42b, 42b communicating between an outlet block 47 of the flow controller 3 and each of the outlet opening/closing valves 5, and gas passages 42c, 42c communicating with each of the outlet opening/closing valves 5 and a process gas passage 10 of the process gas passage block 44.

The invention according to the fifteenth aspect is the invention according to any one of the eleventh aspect to the fourteenth aspect which is adapted so that the flow controller 3 is a pressure type flow controller which uses a piezoelectric element driving control valve and the two pressure type flow controllers are arrayed in parallel in a direction of width W.

The invention according to the sixteenth aspect is the invention according to any one of the eleventh aspect to the fourteenth aspect, in which the flow controller 3 is a pressure type flow controller which uses a piezoelectric element driving control valve, the two piezoelectric element driving control valves are arrayed in parallel in a direction of width W when viewed from above, and a control circuit 23 which forms control circuits 2A, 2B for the two pressure type flow controllers is arrayed on a lateral side of one of the piezoelectric element driving control valves.

The invention according to the seventeenth aspect is the invention according to any one of the eleventh aspect to the fourteenth aspect, in which the flow controller 3 is a pressure type flow controller which uses a piezoelectric element driving control valve, the two piezoelectric element driving control valves are arrayed in parallel in a direction of width W when viewed from above, and a control circuit 23 which forms the control circuits 2A, 2B for the two pressure type flow controllers is arranged in a divided manner at three sites, that is, on both sides and the front surface side thereof.

The invention according to the eighteenth aspect is the invention according to any one of the fourth aspect or the eleventh aspect to the fourteenth aspect, in which the flow controller 3 is adapted so as to have a main body block 45 equipped with an inlet block 46 and an outlet block 47, and the main body block 45 of the flow controller 3 is structured so that the valve chamber recessed parts 30, 30 of two piezoelectric element driving control valves are installed in parallel on the front surface side of a rectangular column-shaped block body, two pressure detector attachment recessed parts 31, 31 are installed in parallel at the back surface side of the block body, and the gas passages 37, 37 communicating between each of the valve chamber recessed parts 30 and each of the pressure detector attachment recessed parts 31, the gas passages 36, 36 communicating between each of the valve chamber recessed parts 30 and the inlet block 46, the gas passages 38, 38 communicating between each of the pressure detector attachment recessed parts 31 and the outlet block 47, and two flow controllers 3 which have orifices 35, 35 installed between individual gas passages 38 and which form two gas supply lines S supported by the gas inlet-side block 41 and the gas outlet-side block 42 are formed in an integrated manner.

The invention according to the nineteenth aspect is the invention according to the eighteenth aspect, in which the outlet block 47 is adapted so as to have a gas passage 47a communicating between a gas passage 38A of the main body block 45 and a gas passage 42a of the outlet-side block 42, and a gas passage 47b communicating between a gas passage 38B of the main body block 45 and a gas passage 42b of the outlet-side block 42.

The invention according to the twentieth aspect is the invention according to the nineteenth aspect, in which the outlet block 47 is formed by coupling a first block body 47' to a second block body 47".

The invention according to the twenty-first aspect is the invention according to the eighteenth aspect, in which the outlet block 47 is adapted so that attachment recessed parts 31a, 31a for second pressure detectors 4A', 4B' are installed so as to oppose each other respectively at the front surface side and the back surface side thereof, one second pressure detector attachment recessed part 31a is communicated to a gas passage 47a communicating between the gas passage 38A of the main body block 45 and the gas passage 42a of the outlet block 42 by a gas passage 52a, and the other second pressure detector attachment recessed part 31a is communicated to a gas passage 47b communicating between the gas passage 38B of the main body block 45 and the gas passage 42b of the outlet-side block 42 by a gas passage 52b, respectively.

The invention according to the twenty-second aspect is the invention according to any one of the fourth aspect and from the eleventh aspect to the fourteenth aspect, in which the flow controller 3 is a main body block 45 equipped with an inlet block 46 and an outlet block 47, and the main body block 45 of the flow controller 3 is structured so that valve chamber recessed parts 30, of two piezoelectric element driving control valves and valve chamber recessed parts 59A, 59B of two switching valves are installed in parallel on the front surface side of the rectangular column-shaped block body, and two pressure detector attachment recessed parts 31, 31 are installed in parallel at the back surface side of the block body, respectively, and gas passages 37, 37 communicating between each of the valve chamber recessed parts 30 and the pressure detector attachment recessed part 31, gas passages 36, 36 communicating between each of the valve chamber recessed parts 30 and the inlet block 46, gas passages 38, 38 communicating between each of the pressure detector attachment recessed parts 31 and the outlet block 47, orifices 35, 35 installed between individual gas passages 38, gas passages 53, 53 communicating between each of the valve chamber recessed parts 59, 59 of the switching valve and each of the gas passages 38, 38, gas passages 54, 54 communicating between each of the valve chamber recessed parts 59, 59 of the switching valve and the outlet block 47, and two flow controllers 3 which have orifices 55, 55 installed between the gas passages 54, 54 and form two gas supply lines S supported by the gas inlet-side block 41 and the gas outlet-side block 42 are formed in an integrated manner.

The invention according to the twenty-third aspect is the invention according to the twenty-second aspect, in which the outlet block 47 is adapted so that there are installed a gas passage 47a communicating between a gas passage 38A of the main body block 45 and a gas passage 42a of the gas outlet-side block 42 and a gas passage 47b communicating between a gas passage 38B of the main body block 45 and a gas passage 42b of the gas outlet-side block 42, and there are provided a gas passage 62a communicating between a gas passage 54a of the main body block 45 and the gas passage 47a and a gas passage 62b communicating between a gas passage 54b of the main body block 45 and the gas passage 47b.

The invention according to the twenty-fourth aspect is the invention according to any one of the eleventh aspect to the fourteenth aspect, in which on one side surface of the gas inlet-side block 41, there are attached and fixed sequentially a process gas inlet joint 6 and an inlet opening/closing valve 1 which form one gas supply line S as well as a process gas inlet joint 6 and an inlet opening/closing valve 1 which form the other gas supply line S, with a space kept in a direction of depth L.

The invention according to the twenty-fifth aspect is the invention according to the twenty-fourth aspect, in which on one side surface of the gas inlet-side block 41, the inlet opening/closing valve 1 is screwed and fixed and the process gas inlet joint 6 is fixed by using a fixing bolt 21.

The invention according to the twenty-sixth aspect is an integrated type gas supplying apparatus which places a plurality of gas supply lines S in parallel in which a process gas is allowed to be distributed through an inlet opening/closing valve 1, a three-way switching opening/closing valve 2, a flow controller 3 and an outlet opening/closing valve 5 and a purge gas is also allowed to flow-in through the three-way switching opening/closing valve 2, and the integrated type gas supplying apparatus which is characterized in that the opening/closing valves 1, 2, 5 are structured so as to respectively have main body blocks 18, 20, 19, the flow controller 3 is structured so as to have a main body block 45, the main body block 45 is structured so that the two flow controllers 3, 3 are attached and fixed adjacently, a gas inlet-side block 46 and a gas outlet-side block 47, each of which is in the shape of a rectangular column with height H' and has a gas distribution passage, are arrayed in parallel, with a space kept in a direction of depth L, the main body block 18 of the inlet opening/closing valve 1 which forms one gas supply line S, the main body block 20 of the three-way switching opening/closing valve 2 and an inlet block 15 fixed on the main body block 45 of the flow controller 3 are fixed to one side surface of the gas inlet-side block 12 from one direction, and an outlet block 16 fixed on the main body block 45 of the flow controller 3 and the main body block 19 of the outlet opening/closing valve 5 are fixed to one side surface of the gas outlet-side block 13 from one direction, with a space between individual gas distribution passages which oppose each other kept airtight, thereby forming the one gas supply line S, and another gas supply line S which opposes the gas supply line S is also formed on the other side surface of the gas inlet-side block 12 and that of the gas outlet-side block 13.

The invention according to the twenty-seventh aspect is the invention according to the twenty-sixth aspect, in which the gas supply lines S, S which oppose each other are disposed and fixed in parallel at a plurality of stages in a direction of height H of the gas inlet-side block 12 and that of the gas outlet-side block 13, with a predetermined space kept, thereby constituting an integrated type gas supplying apparatus having two gas supply lines S, and the two integrated type gas supplying apparatuses are arranged so as to oppose each other in a width W direction, then combined and fixed in a line, thereby stacking and fixing unit bodies 51, each of which has four gas supply lines S, at a plurality of stages in a direction of height H.

The invention according to the twenty-eighth aspect is the invention according to the twenty-sixth aspect or the twenty-seventh aspect, in which the two integrated type gas supplying apparatuses are combined and fixed in a line in a direction of width W, with their positions relatively deviated in a depth L direction, thereby making the width W thereof smaller than two times the width of each of the integrated type gas supplying apparatuses.

The invention according to the twenty-ninth aspect is the gas supplying apparatus according any one of the twenty-sixth aspect to the twenty-eighth aspect, in which the unit bodies 51 stacked and fixed in a height direction are adapted so as to be provided in four units.

The invention according to the thirtieth aspect is the invention according to any one of the first aspect, the fourth aspect, the eleventh aspect and the twenty-sixth aspect, in which the flow controller 3 is a pressure type flow controller or a thermal type flow control device.

Effect of the Invention

The invention according to the first aspect of the present application is a gas supplying apparatus in which a supplying line is formed with a gas inlet-side block, a gas outlet-side block and a plurality of fluid control devices, and the gas supplying apparatus is formed with at least two gas supply lines, the fluid control device of each of the gas supply lines includes at least one flow controller, an inlet-side block of the flow controller of one line is connected to an inlet-side block of the flow controller of the other line so as to oppose the inlet-side block, and an outlet-side block of the flow controller of one line is connected to an outlet-side block of the flow controller of the other line so as to oppose the gas outlet-side block. As a result, it is possible to increase or decrease the number of gas supply lines as appropriate and it is also possible to downsize the gas supplying apparatus and simplify the structure thereof as well as facilitate assembly and maintenance/inspection of the apparatus.

The invention according to the fourth aspect or the fifth aspect of the present application is adapted so that the inlet block 12 and the outlet-side block 13, each of which assumes a rectangular column shape with length H' and has a predetermined gas distribution passage, are arrayed in parallel, with a space kept in a direction of depth L, the plurality of gas supply lines are stacked in a direction of height H, then arrayed and fixed in parallel to both right and left side surfaces of both of these blocks 12, 13 when viewed from the front. Therefore, the inlet block 12 and the outlet-side block 13 are reduced to about half in length dimension H', as compared with conventional blocks. Thus, the integrated type gas supplying apparatus can be significantly decreased in height dimension H and even the apparatus having 16 types of gas supply lines can be downsized to about 250 mm or less in height dimension H, 250 mm or less in depth dimension L and about 350 mm or less in width dimension W.

In a similar manner, the invention according to the eleventh aspect or the twelfth aspect of the present application is adapted so that two flow controllers are arranged so as to be adjacent, two pairs of gas supply lines are arrayed on both right and left sides, when viewed from above, thereby giving a single flow rate control unit, the flow rate control unit is supported and fixed to the inlet-side block 41 and the outlet-side block 42 arrayed in parallel, with a space kept in a direction of width W, thereby forming two gas supply lines as a pair, these two gas supply lines as a pair are stacked in a plural number in a height direction H, then arrayed in parallel, and the inlet-side block 41 and the outlet-side block 42 are respectively coupled and fixed to a purge gas passage block 43 and a process gas passage block 44, each of which is long/narrow and has height direction dimension H'. Therefore, as with the invention according to the fourth aspect, it is possible to significantly downsize the integrated type gas supplying apparatus.

Further, in the invention according to the fourth aspect or the fifth aspect, various devices which constitute the integrated type gas supplying apparatus can all be attached to or detached from the lateral side of the integrated type gas supplying apparatus. Thus, the apparatus can be extremely easily managed for maintenance.

Still further, in the invention according to the eleventh aspect or the twelfth aspect, the flow rate control unit, etc., can be detached by removing a cap bolt 50 from the lateral side. In practice, this is extremely convenient in allowing for maintenance management, etc.

In addition, in the invention according to the twenty-sixth aspect or the twenty-seventh aspect, two integrated type gas supplying apparatuses having a plurality of gas supply lines S are allowed to oppose each other, and they are arrayed in a line in a width W direction, then combined and fixed, thereby, providing a system in which unit bodies 51, each of which has four gas supply lines S, are stacked and supported at a plurality of stages in a height direction. Therefore, the integrated type gas supplying apparatus can be significantly decreased in overall height dimension H. The gas supplying apparatuses are combined so as to oppose each other, with each position in a direction of depth L being deviated, by which the gas supplying apparatus can be made smaller in overall width dimension than two times the width dimension W of each of the integrated type gas supplying apparatuses to be combined. Thus, the gas supplying apparatus can be easily used in a clean room with a low ceiling.

BRIEF DESCRIPTION OF THE DRAWINGS

FIG. 20 is a right side view of FIG. 18.

FIG. 21 is a perspective view which shows one example of a conventional integrated type gas supplying apparatus (Japanese Published Unexamined Patent Application No. H05-172265).

DETAILED DESCRIPTION OF THE PREFERRED EMBODIMENTS

Hereinafter, a description will be given of individual embodiments of the present invention with reference to drawings.

Embodiment 1

FIG. 1 to FIG. 6 show Embodiment 1 of the present invention.

Figure 1:
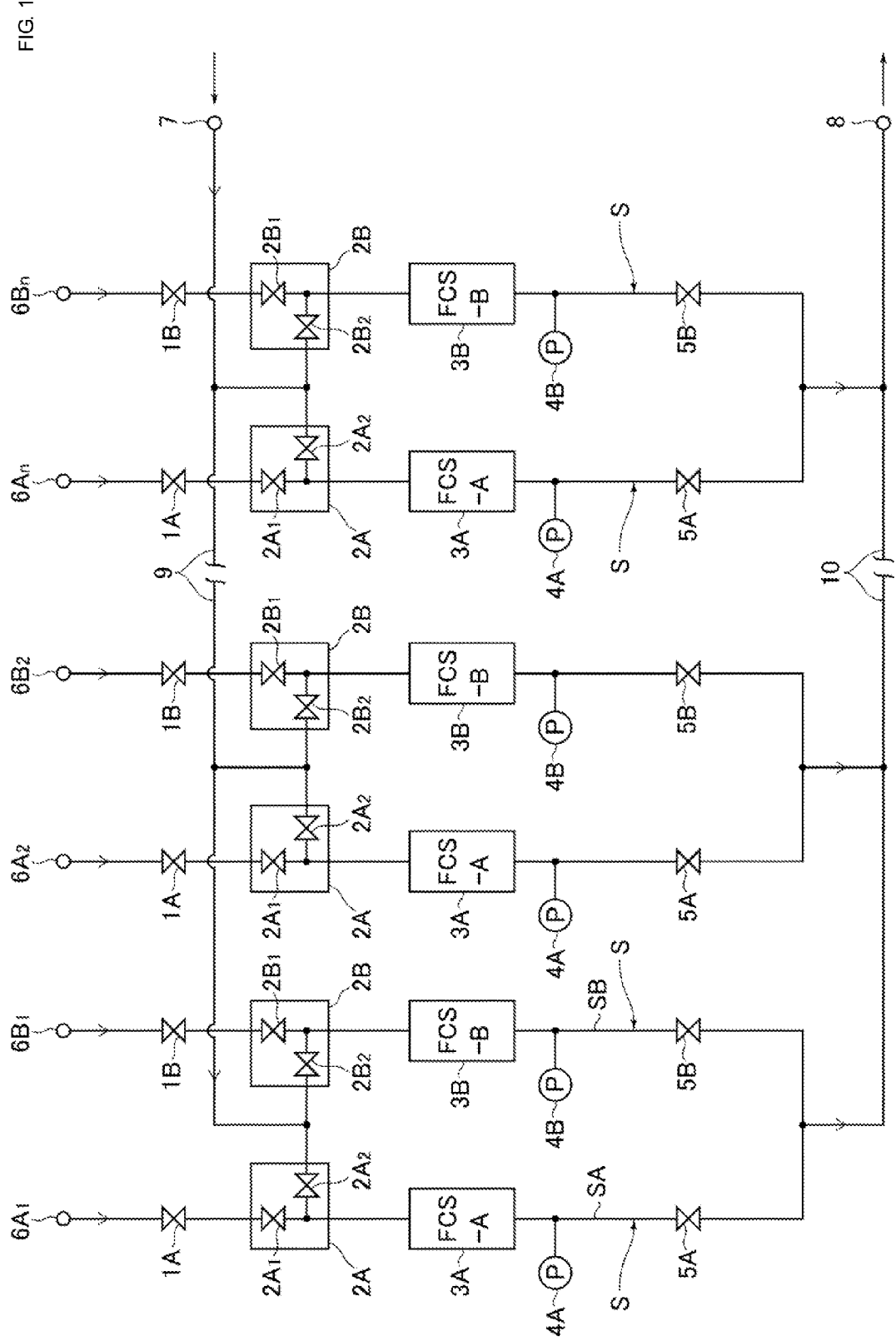
FIG. 1 is a drawing which shows a gas supplying system which omits a part of a gas supplying apparatus of the present invention.

That is, FIG. 1 is a systematic diagram which shows major parts of an integrated type gas supplying apparatus for semiconductor manufacturing equipment of Embodiment 1 in the present invention, with some parts omitted. The integrated type gas supplying apparatus supplies a plurality of different types of gases (here, 16 types of gases) through a process gas passage 10 from a process gas outlet joint 8 to a process treatment device (not illustrated).

Figure 2:
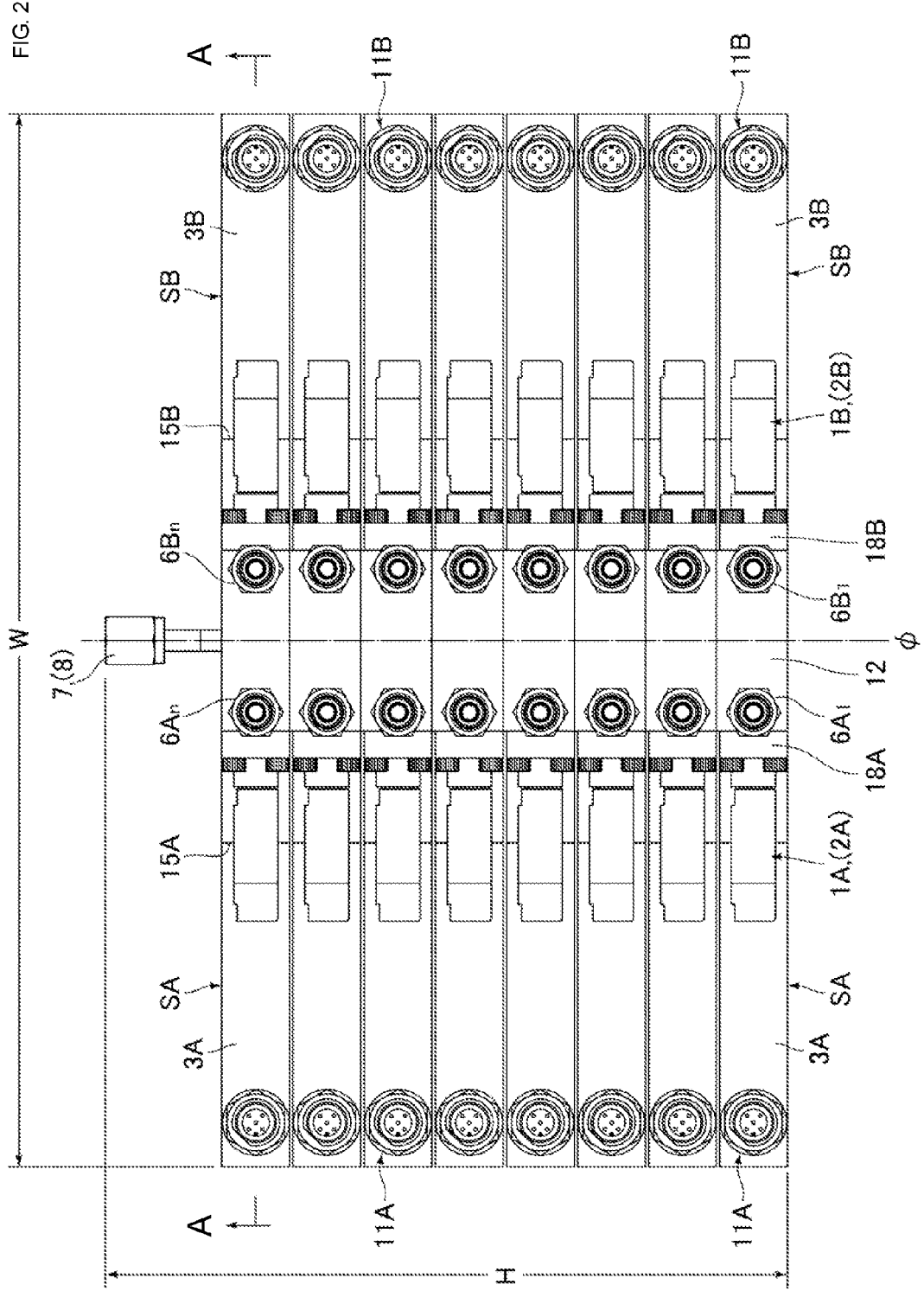
FIG. 2 is a front elevational view which shows an integrated type gas supplying apparatus for semiconductor manufacturing equipment of Embodiment 1 in the present invention.
Figure 3:
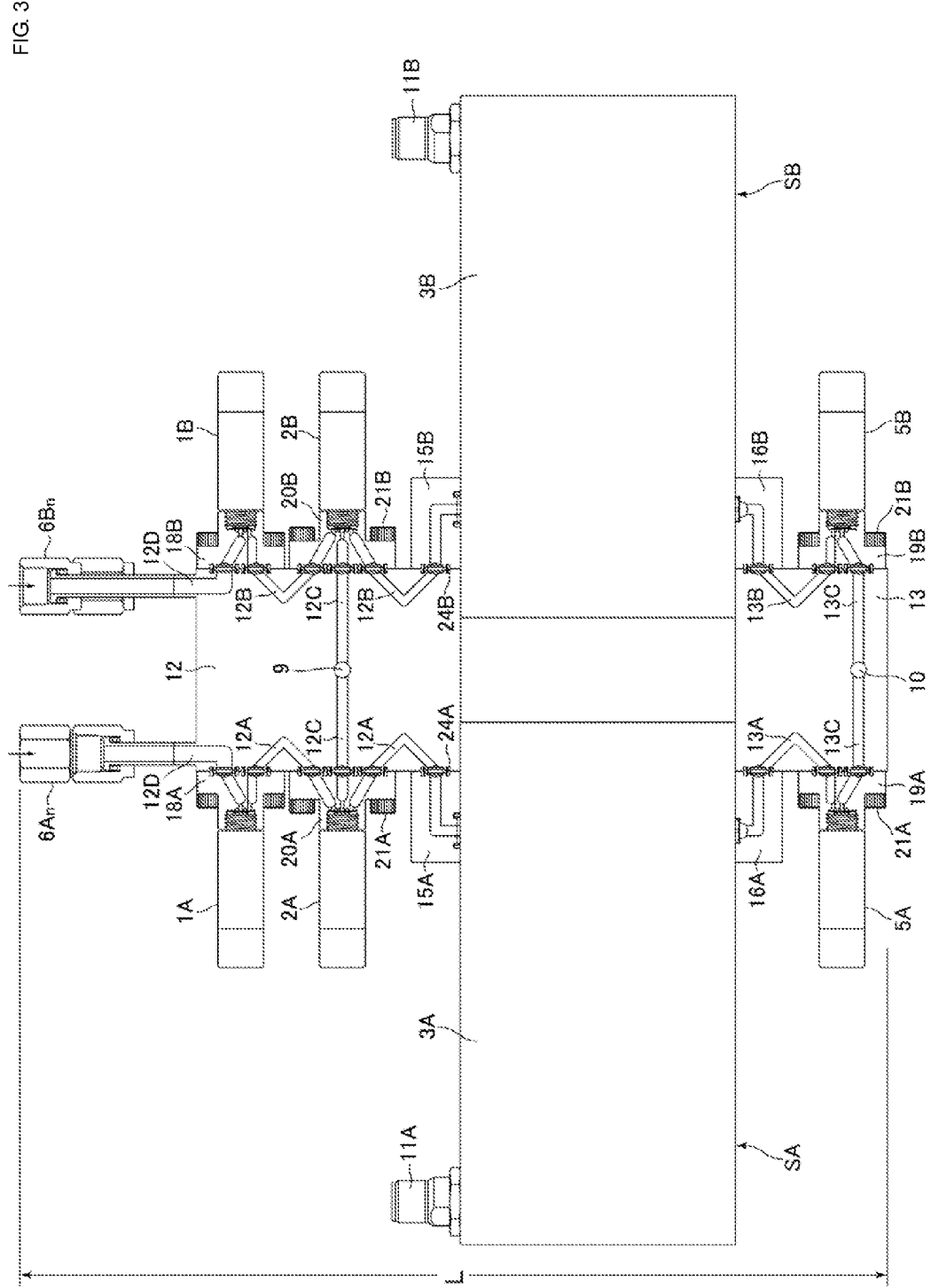
FIG. 3 is an enlarged cross sectional schematic drawing which is taken along a line A to A in FIG. 2.
Figure 4:
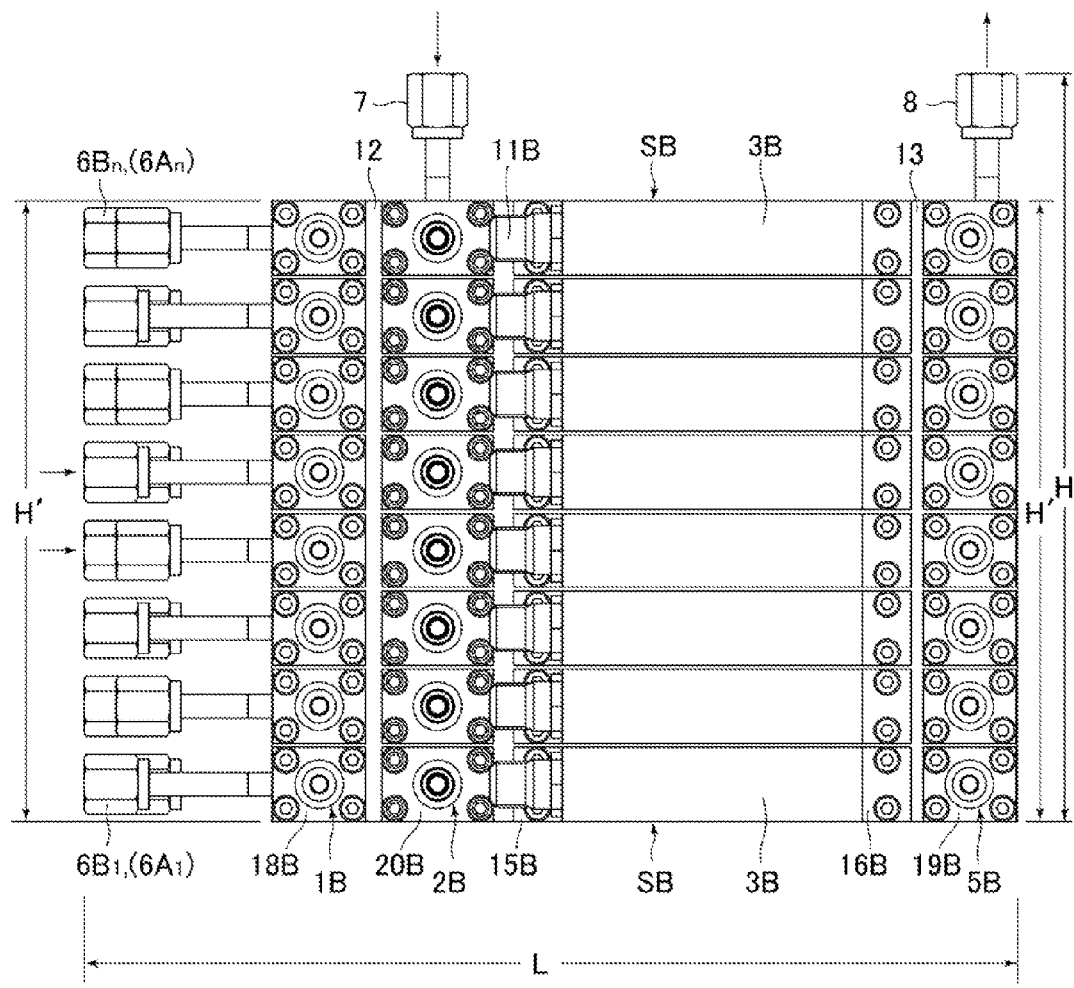
FIG. 4 is a right side view of FIG. 2.
Figure 5:
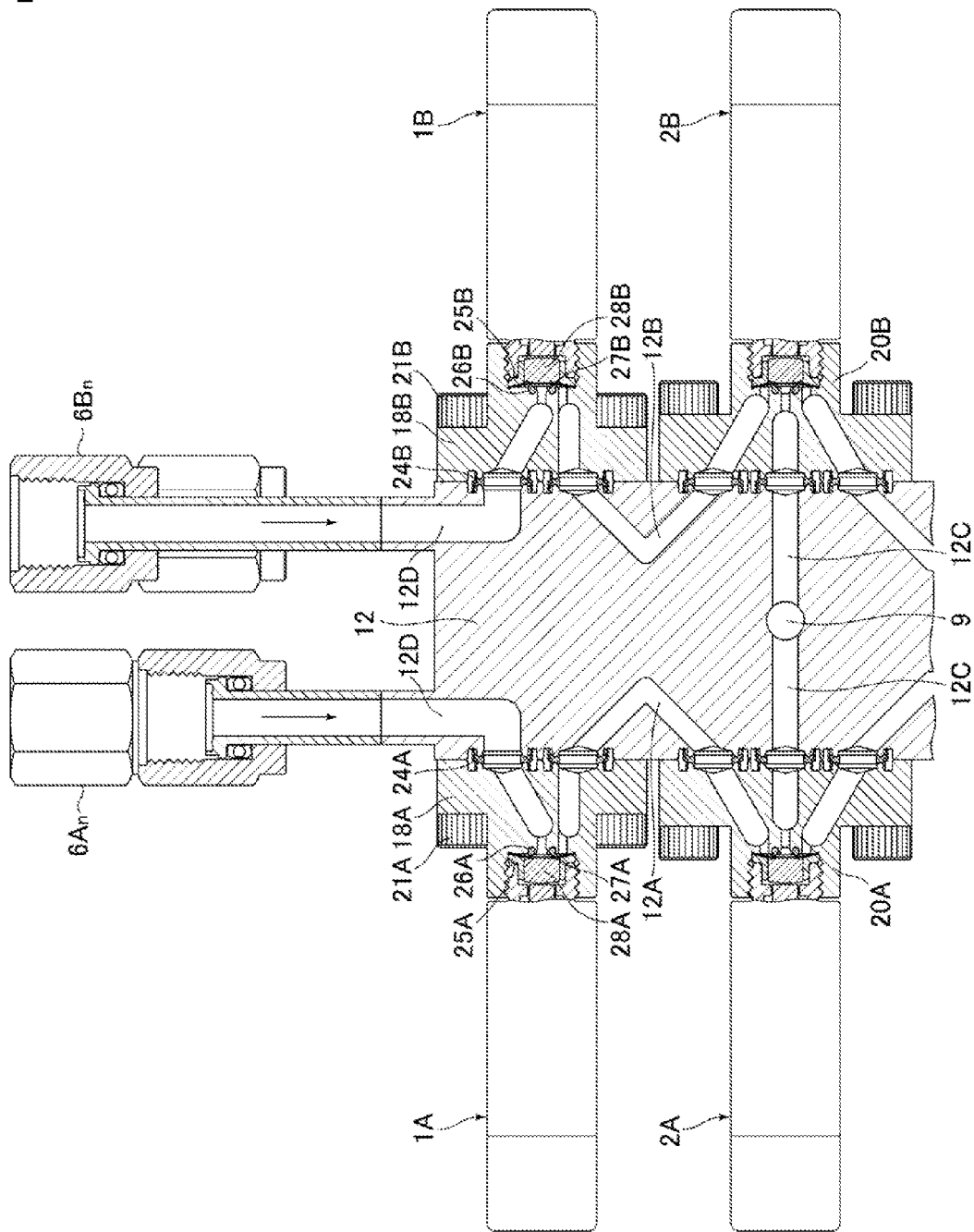
FIG. 5 is a partially enlarged view which shows an attachment state of an inlet opening/closing valve and that of a three-way switching opening/closing valve which are attached to a gas inlet-side block in FIG. 3.
Figure 6:
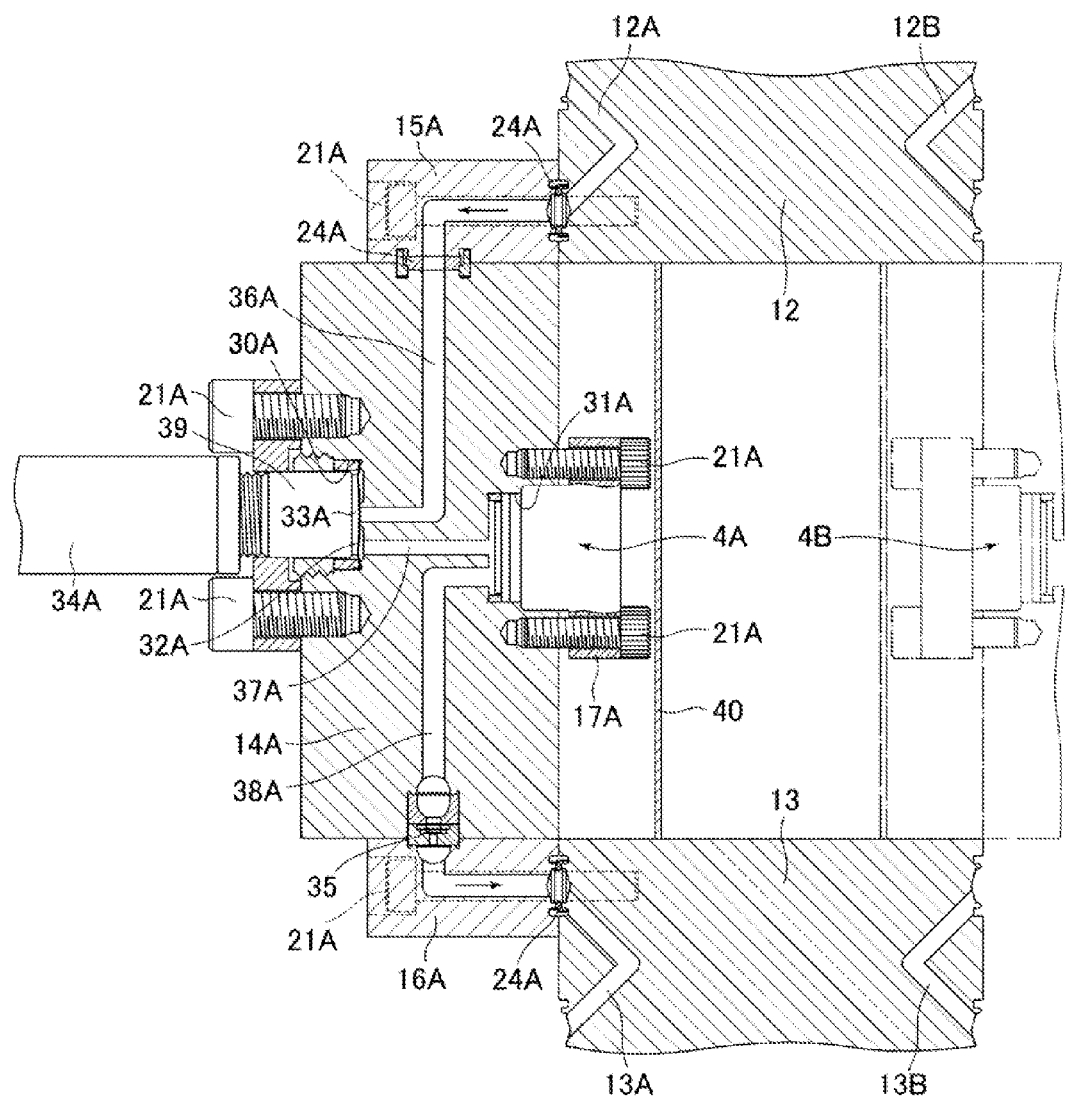
FIG. 6 is a cross sectional view which enlarges an attachment part of a main body block of a pressure type flow controller in FIG. 3.

FIG. 2 is a front elevational view which shows the integrated type gas supplying apparatus of Embodiment 1 of the present invention. FIG. 3 is a cross sectional schematic view taken along the line A to A in FIG. 2. FIG. 4 is a right side view of FIG. 2. Further, FIG. 5 is a partially enlarged view which shows an attachment state of an inlet-side opening/closing valve and a three-way switching opening/closing valve to an inlet-side block. FIG. 6 is a partially enlarged longitudinal sectional view which shows an attachment state of a main body block of a pressure type flow controller.

First, in a description of Embodiment 1 of the present application, a side where the purge gas inlet joint 7 and the process gas outlet joint 8 in the front elevational view of FIG. 2 are installed is referred to as an upper side of the integrated type gas supplying apparatus (plane side), a side where the outlet opening/closing valves 5A, 5B of FIG. 3 are installed is referred to as a lower side (bottom side) of the integrated type gas supplying apparatus, a side where process gas inlet joints $6A_n$, $6B_n$ of FIG. 3 are installed is referred to as a front surface side of the integrated type gas supplying apparatus, a side where an input/output connecting tool 11A of a flow control device 3A of FIG. 3 is installed is referred to as a left side of the integrated type gas supplying apparatus, a side where an input/output connecting tool 11B of a flow control device 3B of FIG. 3 is installed is referred to as a right side of the integrated type gas supplying apparatus, and a side where a gas outlet-side block 13 of FIG. 3 is installed is referred to as a back surface side.

Further, in the description of Embodiment 1 of the present application, width W, depth L and height H of the integrated type gas supplying apparatus are as per shown in FIG. 2, FIG. 3 and FIG. 4, and a direction of depth L is also referred to as a longitudinal direction.

In FIG. 1 to FIG. 4, reference symbol 1A, 1B denotes an inlet opening/closing valve, 2A, 2B denotes a three-way switching opening/closing valve, 3A, 3B denotes a pressure type flow controller (FCS-A, FCS-B), 4A, 4B denotes a pressure detector, 5A, 5B denotes an outlet opening/closing valve, 6A1 to 6An denotes a process gas inlet joint, 6B1 to 6Bn each denotes a process gas inlet joint, 7 denotes a purge gas inlet joint, 8 denotes a process gas outlet joint, 9 denotes a purge gas passage, 10 denotes a process gas passage, 11A denotes an input/output connecting tool (cable connector), and 11B denotes an input/output connecting tool (cable connector).

Further, in FIG. 3 to FIG. 6, reference symbol 12 denotes a gas inlet-side block, 12A, 12B denotes a V-shaped gas passage, 12C denotes a gas passage, 13 denotes a gas outlet-side block, 13A, 13B denotes a V-shaped gas passage, 13C denotes a gas passage, 14A (14B is not illustrated) denotes a pressure type flow controller main body block, 15A, 15B denotes a pressure type flow controller inlet block, 16A, 16B denotes a pressure type flow controller outlet block, 17A (17B is not illustrated) denotes a pressure detector attachment block, 18A, 18B denotes an inlet opening/closing valve main body block, 19A, 19B denotes an outlet opening/closing valve main body block, 20A, 20B denotes a three-way opening/closing valve main body block, and 21A, 21B denotes a fixing bolt. And, each of pressure type flow controllers 3A, 3B is provided with a driving body (not illustrated) and a control circuit (not illustrated).

With reference to FIG. 1, the integrated type gas supplying apparatus of the present invention is adapted so as to supply a plural types of gases to a process chamber by switching them. The gas of each type is supplied to a process chamber (not illustrated) through a plurality of gas supply lines S, S similar in constitution to a gas supply line S formed with coupling a process gas inlet joint 6A, an inlet opening/closing valve 1A, a three-way opening/closing valve 2A, a pressure type flow controller 3A, a pressure detector 4A and an outlet opening/closing valve 5A in a line (in a serial manner) and also through a process gas outlet joint 8.

Further, in the integrated type gas supplying apparatus, a purge gas is supplied to the purge gas passage 9 through the purge gas inlet joint 7, and every time a type of gas supplied to the process chamber is switched, the three-way opening/closing valve 2A, 2B, etc., are operated to purge the gas passage.

Still further, although not shown in FIG. 1 to FIG. 4, each of the pressure type flow controllers 3A, 3B is provided with a gas temperature detector (not illustrated), a portion which connects each of various devices with a gas passage of each block body is provided with a sealing portion, each of the sealing portion, etc., is provided with a leakage detection hole (not illustrated) and each of the gas supply lines S is provided with a filtering device (not illustrated) and an automatic pressure regulating device (not illustrated) etc., as necessary.

It is noted that "Wseal" made by Fujikin Incorporated is used as a sealing member 24 at the sealing portion, and a UPG fittings (HEX14) made by Fujikin Incorporated is used at the gas inlet joints 6, 7 and the gas outlet joint 8. However, as a matter of course, it is acceptable that a sealing member and a joint other than those described above are used.

Further, the supply and operation of a gas by the integrated type gas supplying apparatus are similar to those by a conventional integrated type gas supplying apparatus and have been publicly known. Thus, a detailed description thereof will be omitted.

In the integrated type gas supplying apparatus of Embodiment 1, as shown in FIG. 2 and FIG. 3, a total of 16 gas supply lines S for supplying 16 types of gases are divided into two groups and arranged in a symmetrical manner on both left and right sides of a center line φ of width W, when viewed from the front.

That is, as shown in the front elevational view of FIG. 2, eight gas supply lines SA are stacked in parallel on the left side of the center line φ, while eight gas supply lines SB are stacked in parallel on the right side of the center line φ. Each of them is arrayed so as to assume a line symmetry with respect to the center line φ and stacked at eight stages.

More specifically, as shown in the horizontal sectional view of FIG. 3, the gas supply lines SA, SB are arranged in a symmetrical manner on both left and right side surfaces of the gas inlet-side block 12 and the gas outlet-side block 13. As shown in the front elevational view of FIG. 2, they are disposed and fixed in a line in a direction of width W so as to oppose each other. Then, eight units of each of the gas supply lines SA, SB disposed and fixed in a line are stacked and arrayed horizontally and in parallel, thereby constituting the integrated type gas supplying apparatus with height H.

With reference to FIG. 3 and FIG. 4, the gas inlet-side block 12 is formed into a rectangular column-shaped long/narrow block column with length (height) H'. A gas passage 12D communicating the inlet opening/closing valves 1A, 1B with the process gas inlet joints 6An, 6Bn, V-shaped gas passages 12A, 12B communicating the inlet opening/closing valves 1A, 1B with the three-way opening/closing valves 2A, 2B, a gas passage 12C communicating the three-way opening/closing valves 2A, 2B with the purge gas passage 9, and V-shaped gas passages 12A, 12B communicating the three-way opening/closing valves 2A, 2B with inlet blocks 15A, 16B of the flow controllers 3A, 3B are formed in a symmetrical manner on both sides of the gas inlet-side block 12. Further, the purge gas passage 9 is drilled in a direction of length (height) H' of the gas inlet-side block 12.

In a similar manner, the gas outlet-side block 13 is formed into a rectangular column-shaped long/narrow block with length (height) H'. V-shaped gas passages 13A, 13B communicating between outlet blocks 16A, 16B (secondary side) of the flow controllers 3A, 3B and the outlet opening/closing valves 5A, 5B and a gas passage 13C communicating the outlet opening/closing valves 5A, 5B with the process gas passage 10 are formed in a symmetrical manner on both sides of the gas outlet-side block 13. Further, the process gas passage 10 is drilled in a direction of length (height) H' of the gas outlet-side block 13.

The inlet opening/closing valves 1A, 1B, the outlet opening/closing valves 5A, 5B and the three-way switching opening/closing valves 2A, 2B are publicly known. For example, there is used a direct-touch type metal diaphragm valve which uses a multiple stage actuator disclosed in Japanese Published Unexamined Patent Application No. 2004-100889. As a matter of course, any opening/closing valve may be used in addition to a solenoid valve.

Further, in this Embodiment 1, a FCS-type pressure type flow control device made by Fujikin Incorporated is used as the flow control devices 3A, 3B. As a matter of course, it is acceptable that a thermal type flow control device is used as the flow control device 3A, 3B.

It is also acceptable that the inlet opening/closing valves 1A, 1B, the outlet opening/closing valves 5A, 5B and the three-way switching opening/closing valves 2A, 2B are a so-called bellows-type opening/closing valve. It is also acceptable that such a valve is used that is fixed by being screwed directly into a side surface of the gas inlet-side block 12 or the gas outlet-side block 13 or such a valve is used that is fixed with a bolt via a flange.

FIG. 5 is a longitudinal partial sectional view which shows a state of the inlet opening/closing valves 1A, 1B attached to the gas inlet-side block 12 and a state of the three-way switching opening/closing valves 2A, 2B attached thereto. Valve chamber recessed parts 25A, 25B are installed on main body blocks 18A, 18B, 20A, 20B of the individual opening/closing valves, and valve seats 26A, 26B are fitted so as to be fixed on the bottom surfaces of the recessed parts. Further, valve bodies are formed with metal diaphragms 27A, 27B and pressed toward the valve seats 26A, 26B by diaphragm presser 28A, 28B.

That is, the inlet opening/closing valves 1A, 1B and the three-way switching opening/closing valves 2A, 2B are fixed horizontally to side surfaces of the gas inlet-side block 12 by fixing airtight respectively the inlet opening/closing valve main body blocks 18A, 18B and the three-way switching opening/closing valve main body blocks 20A, 20B to the side surfaces on both sides of the gas inlet-side block 12 with fixing bolts 21A, 21B via sealing members 24A, 24B.

In a similar manner, the outlet opening/closing valves 5A, 5B are fixed horizontally to side surfaces of the gas outlet-side block 13 by fixing airtight the outlet opening/closing valve main body blocks 19A, 19B to the side surfaces on both sides of the gas outlet-side block 13 with fixing bolts 21A, 21B via the sealing members 24A, 24B.

The pressure type flow controllers 3A, 3B have been publicly known by Japanese Published Unexamined Patent Application No. 2006-330851, etc. That is, the known metal diaphragm-type piezoelectric element driving control valve disclosed in Japanese Published Unexamined Patent Application No. 2008-249002, etc., is used to adjust a pressure on the upstream side from an orifice, thereby controlling a gas flow rate of the orifice.

FIG. 6 is a partially enlarged longitudinal sectional view which shows an attachment state of the pressure type flow controller 3A in FIG. 3. The inlet block 15A and the outlet block 16A fixed to the pressure type flow controller main body block 14A are respectively fixed to the gas inlet-side block 12 and the gas outlet-side block 13, by which the pressure type flow controller 3A is attached and fixed.

Further, the valve chamber recessed part 30A is installed on the left side surface of the pressure type flow controller main body block 14A, and the attachment recessed part 31A of the pressure detector 4A is installed on the right side surface thereof.

A diaphragm 32A, a diaphragm presser 33A and a hood 34A which constitute a valve body are housed inside the valve chamber recessed part 30A. A pressure detector 4A is housed inside the pressure detector attachment recessed part 31A.

It is noted that in FIG. 6, reference symbol 12 denotes a gas inlet-side block, 13 denotes a gas outlet-side block, 15A denotes an inlet block of pressure type flow controller 3A, 16A denotes an outlet block of pressure type flow controller 3A, 35 denotes an orifice, 36A, 37A, 38A denotes a gas passage, 39 denotes a valve rod, and 40 denotes a cover body.

In FIG. 1 to FIG. 6, each of the gas inlet-side block 12 and the gas outlet-side block 13 is formed into a long/narrow rectangular column with length (height) H', and the inlet opening/closing valve, the three-way switching opening/closing valve and the outlet opening/closing valve which form each of the gas supply lines S are arrayed and fixed to the both side surfaces thereof. As a matter of course, it is acceptable that each of the gas inlet-side block 12 and the gas outlet-side block 13 is divided into eight block bodies and adjacent block bodies are sequentially and combined and fixed airtight in a height direction. In this case, the number of sealing portions is increased according to the number of combination surfaces of each block body. However, the gas flow passage can be drilled on the block body more easily.

In Embodiment 1 shown in FIG. 1 to FIG. 6, where the integrated type gas supplying apparatus is horizontally placed on the upper side part, etc., of the semiconductor manufacturing equipment (that is, in a state that the process gas inlet-side joint 6 is positioned laterally), devices which form each gas supply line S can all be detached and attached from the lateral side (in a horizontal direction). It is, therefore, extremely easy to allow for maintenance management to the integrated type gas supplying apparatus.

Further, where there are also gas supply lines S for 16 types of gases, it is possible to keep both the height dimension H and the depth dimension L of the integrated type gas supplying apparatus to 250 mm or less and also keep the width dimension W to 350 mm or less. Thus, the integrated type gas supplying apparatus can be significantly downsized.

Embodiment 2

Next, with reference to FIG. 7 to FIG. 17, a description will be given of Embodiment 2 of the present invention.

Figure 16:
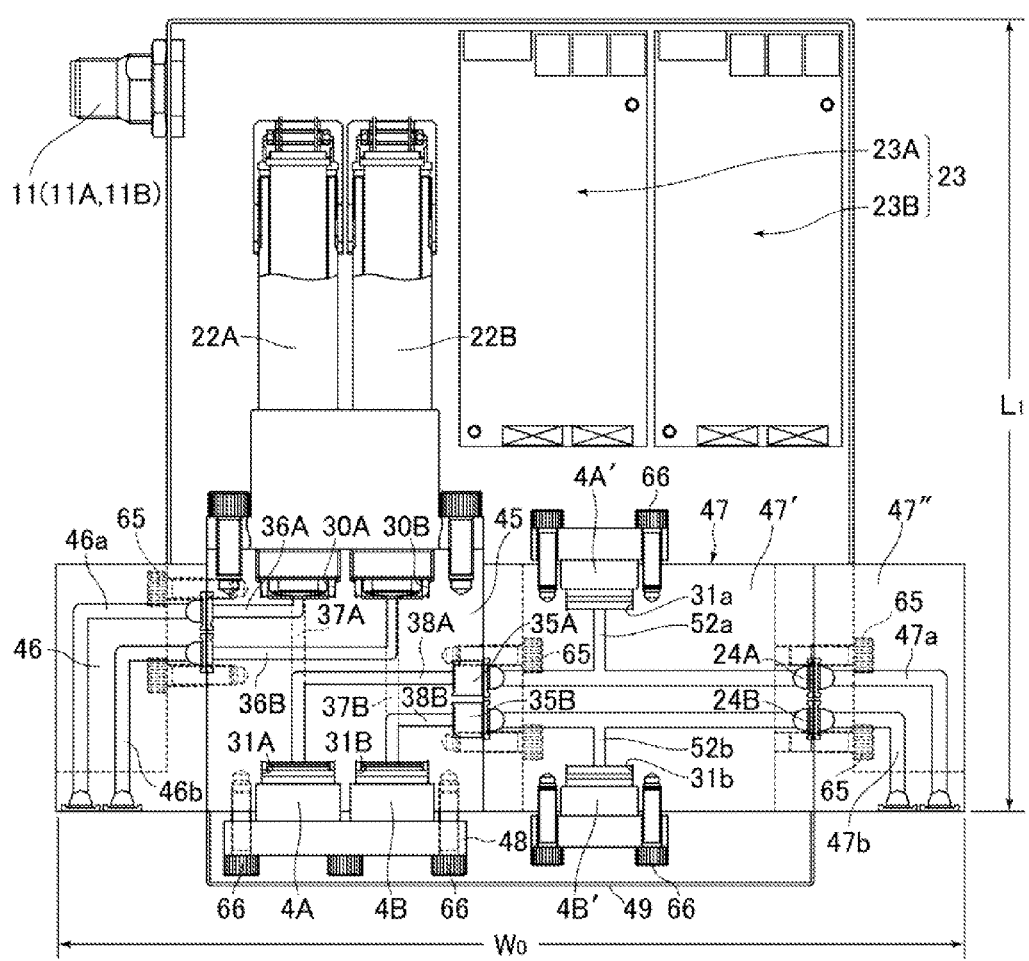
FIG. 16 is a transverse sectional schematic drawing which shows a pressure type flow control device of Example 3 used in Embodiment 2 of the invention of the present application.
Figure 17:
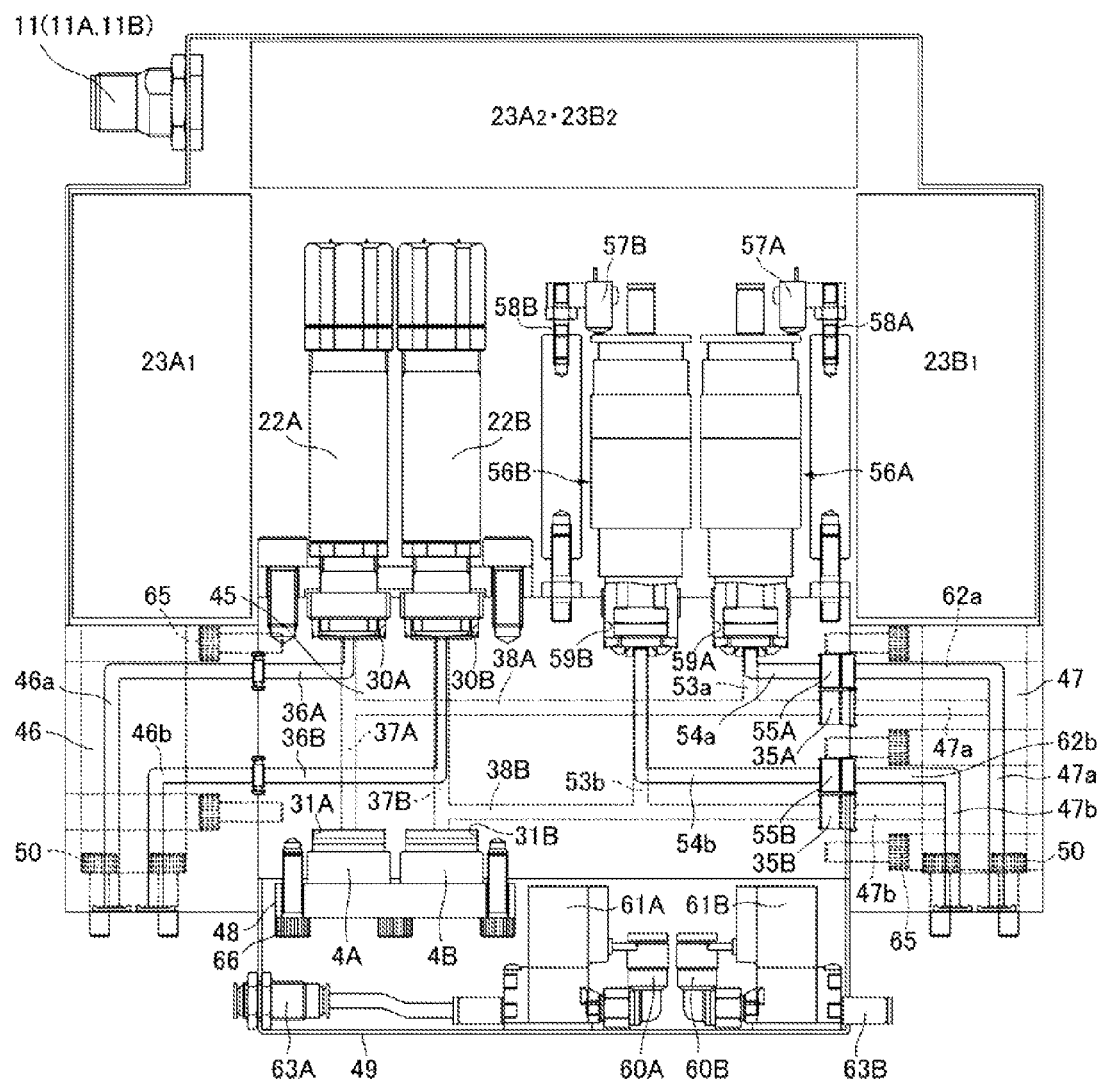
FIG. 17 is a transverse sectional schematic drawing which shows a pressure type flow control device of Example 4 used in Embodiment 2 of the invention of the present application.

FIG. 7 to FIG. 10 show Example 1 of Embodiment 2. FIG. 11 to FIG. 15 show a pressure type flow control device 3 of Example 2 used in Embodiment 2. Further, FIG. 16 shows a pressure type flow control device 3 of Example 3 used in Embodiment 2. FIG. 17 shows a pressure type flow control device 3 of Example 4 used in Embodiment 2.

Example 1

First, with reference to FIG. 7 to FIG. 10, a description will be given of Example 1 of Embodiment 2.

Figure 7:
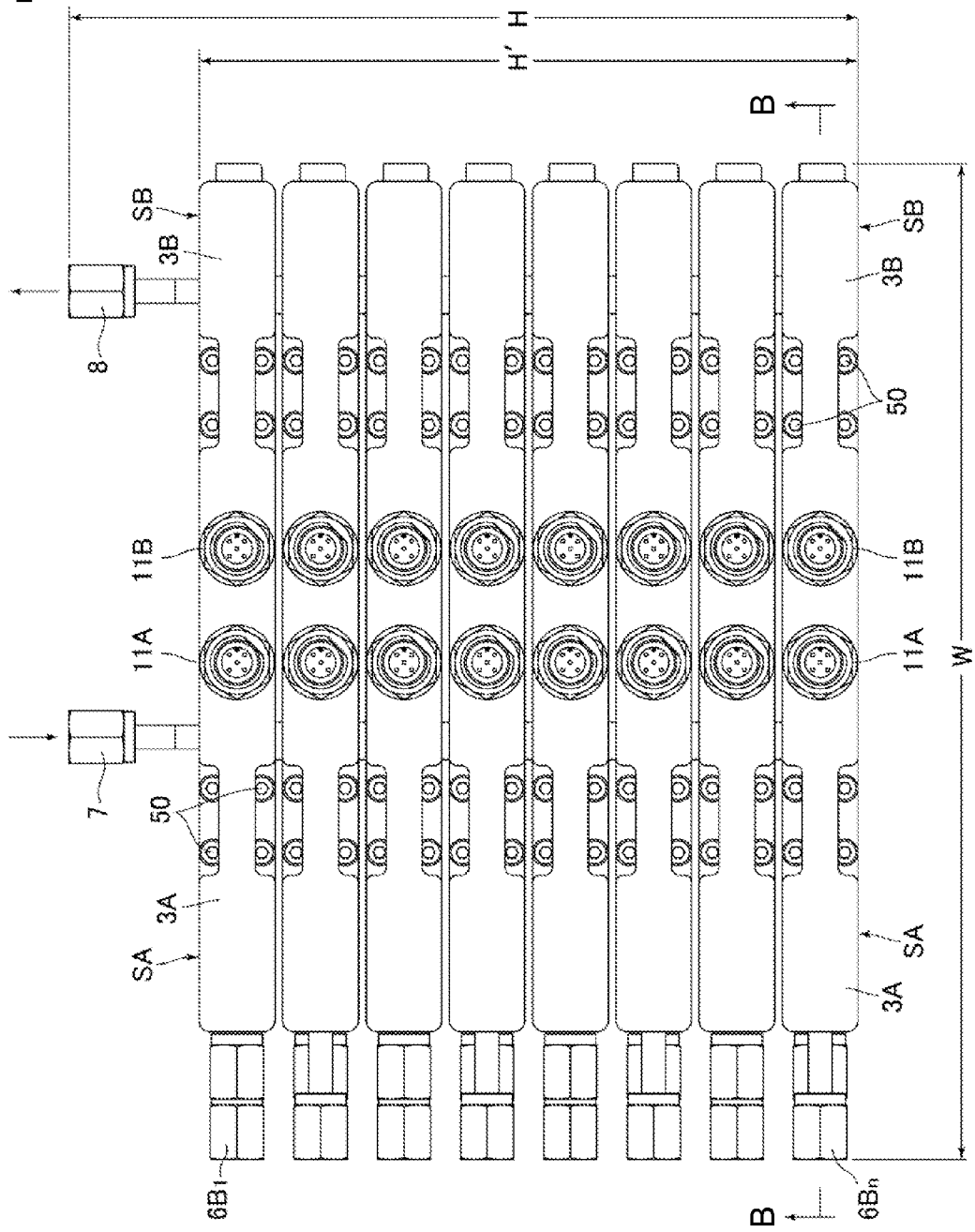
FIG. 7 is a front elevational view which shows an integrated type gas supplying apparatus for semiconductor manufacturing equipment of Embodiment 2 in the present invention.
Figure 8:
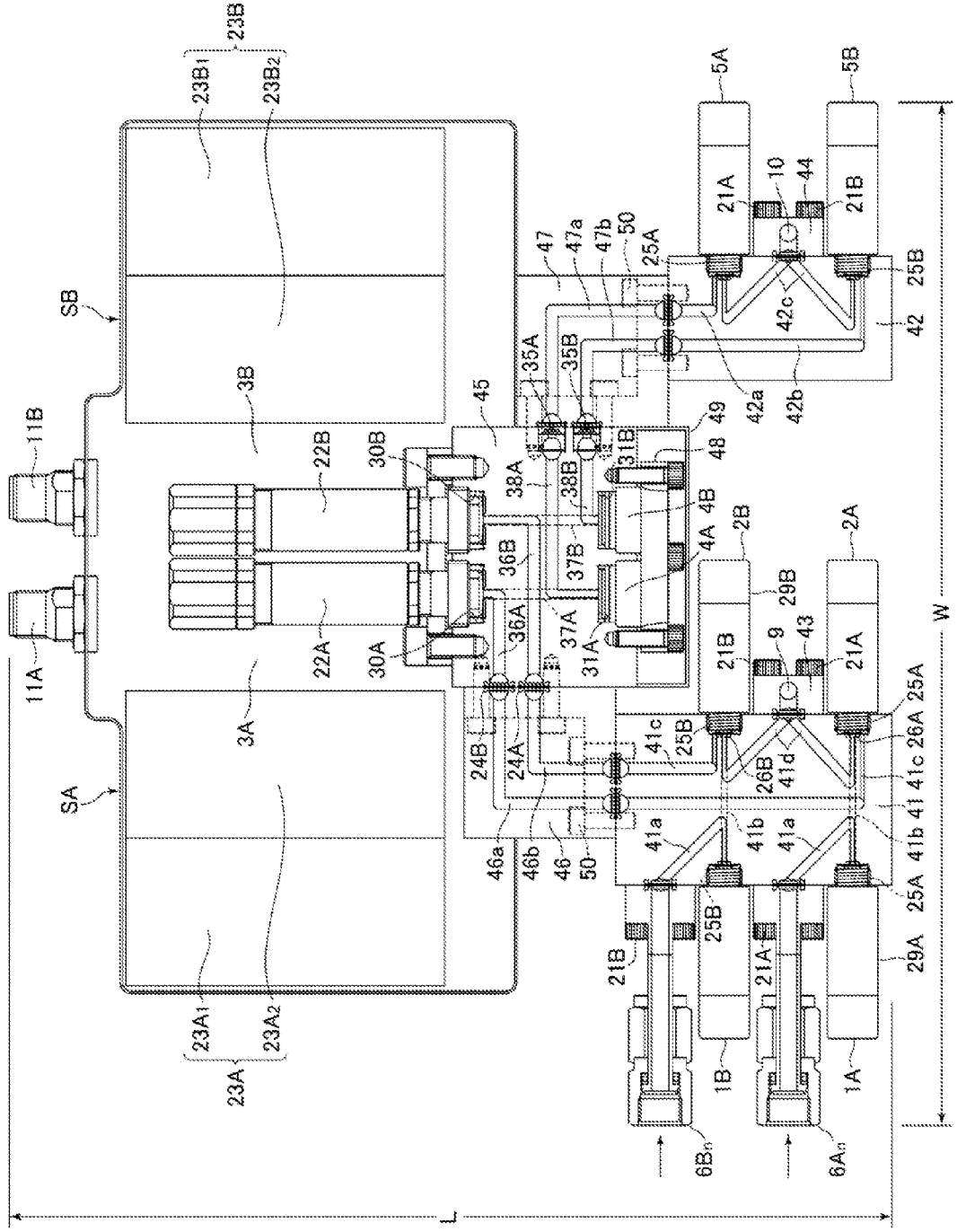
FIG. 8 is a cross sectional schematic drawing which enlarges a part taken along a line B to B in FIG. 7.
Figure 9:
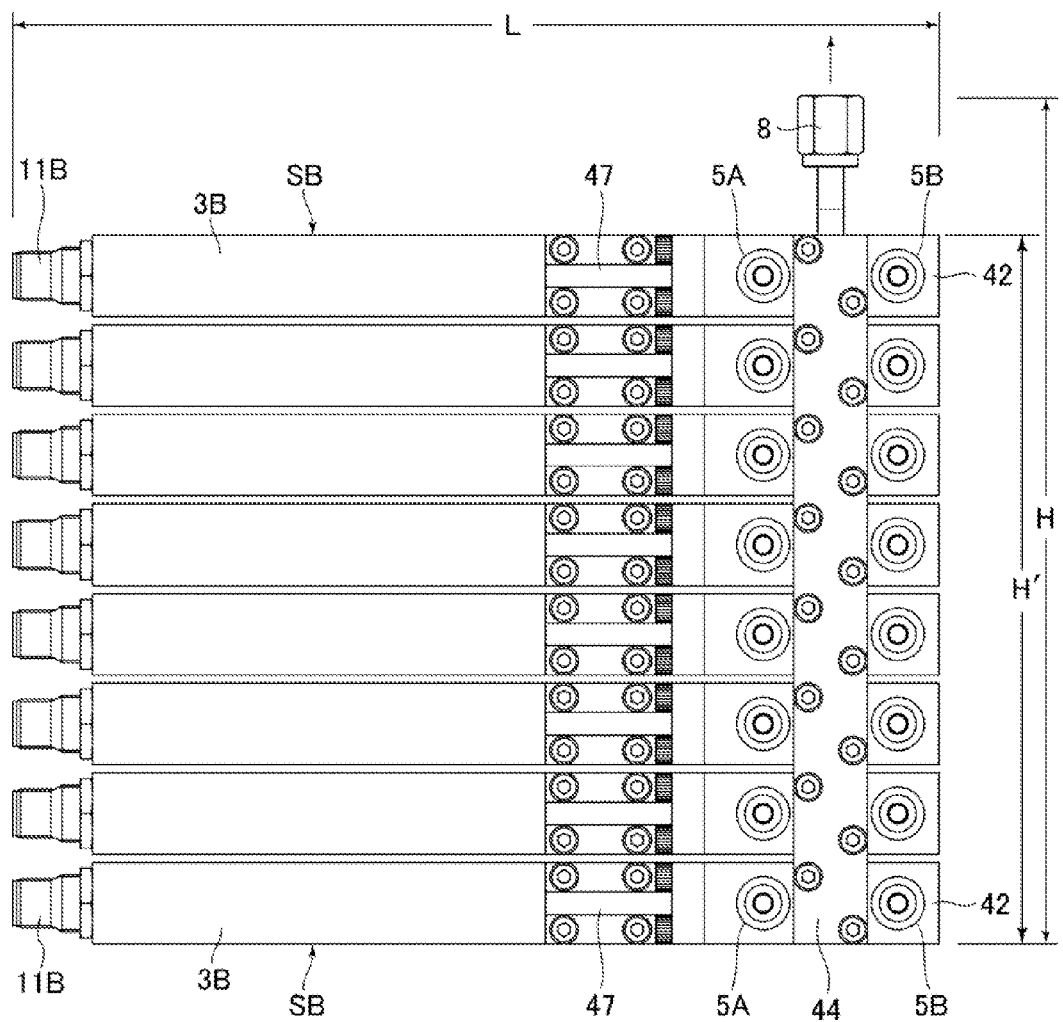
FIG. 9 is a right side view of FIG. 7.
Figure 10:
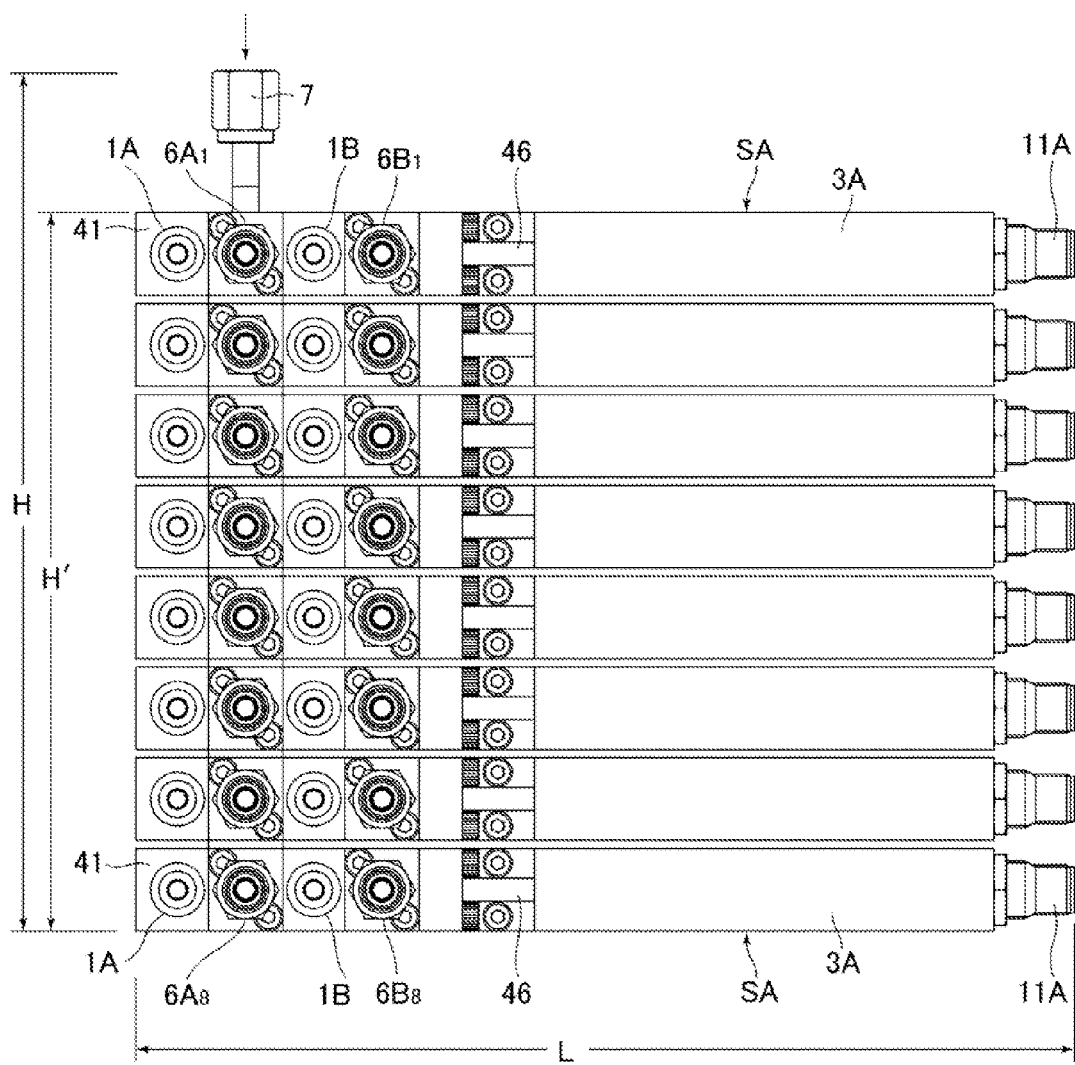
FIG. 10 is a left side view of FIG. 7.

FIG. 7 is a front elevational view which shows an integrated type gas supplying apparatus of Example 1 used in Embodiment 2. FIG. 8 is a sectional view taken along the line B to B in FIG. 7, FIG. 9 is a right side view of FIG. 7, and FIG. 10 is a left side view of FIG. 7.

In FIG. 7 to FIG. 10, the same portions and members as those of FIG. 1 to FIG. 6 are given the same reference symbols.

Further, in the application specification of the integrated type gas supplying apparatus of Example 1 in this Embodiment 2, a side where the purge gas inlet joint 7 and the process gas inlet joint 8 in the front elevational view of FIG. 7 are installed is referred to as an upper side (upper surface side). That is, a side where the input/output connecting tools (cable connectors) 11A, 11B in the horizontal sectional view of FIG. 8 are installed is referred to as a front surface side of the integrated type gas supplying apparatus, a side where the inlet opening/closing valve 1A, the three-way switching opening/closing valve 2A and the outlet opening/closing valve 5B are installed is referred to as a back surface side of the integrated type gas supplying apparatus. Further, a side where the flow control device 3A in FIG. 7 and FIG. 8 is installed is referred to as a left side of the integrated type gas supplying apparatus, and a side of the flow control device 3B is referred to as a right side of the integrated type gas supplying apparatus.

Still further, in the application specification of the integrated type gas supplying apparatus of Embodiment 2, the width W, the depth L and the height H of the integrated type gas supplying apparatus are as per described in FIG. 7 and FIG. 8.

In this Embodiment 2, as shown in FIG. 7 and FIG. 8, a piezoelectric element drive unit 22A of the pressure type flow controller 3A which forms one gas supply line SA and a piezoelectric element drive unit 22B of the pressure type flow controller 3B of the other gas supply line SB are allowed to be adjacent and placed in parallel in a horizontal direction (a direction of depth), which is given as a pair of units. As shown in FIG. 7, eight pairs thereof are stacked in parallel in a direction of height H, then combined and fixed, thereby constituting a stack type gas supplying apparatus which is equipped with gas supply lines for 16 types of gases.

That is, a unit in which two controllers of the pressure type flow controller 3A and the pressure type flow controller 3B are arrayed and fixed in parallel so as to be adjacent laterally is fixed to a gas inlet-side block 41 and a gas outlet-side block 42 to be described later with a fixing cap bolt 50 (refer to FIG. 7 and FIG. 8). Further, the gas inlet-side block 41 and the gas outlet-side block 42 which have fixed the unit composed of these two pressure type flow controllers 3A, 3B are formed in an integrated manner by airtightly and sequentially communicating between the gas inlet-side blocks 41, 41 and the outlet-side blocks 42, 42 which are stacked so as to be adjacent vertically. Eight pairs of the units stacked in parallel as described above are fixed to each other, thereby constituting the stack type gas supplying apparatus which is equipped with 16 gas supply lines S.

The gas inlet-side block 41 is formed into a short rectangular column-shaped block. As shown in FIG. 8, a process gas inlet joint 6B, an inlet opening/closing valve 1B, a process gas inlet joint 6A and an inlet opening/closing valve 1A are arrayed and fixed on the left side surface of the gas inlet-side block 41. And, three-way switching opening/closing valves 2B, 2A are arrayed and fixed on the right side surface thereof.

It is noted that reference symbol 25A, 25B denote valve chamber recessed parts of the opening/closing valves 1B, 1A and three-way switching opening/closing valves 2B, 2A drilled on the gas inlet-side block 41. Each of valve seats 26A, 26B is formed on the bottom surface of the valve chamber recessed part, and valve driving portions (pressing pistons 29A, 29B) are screwed and fixed into the valve chamber recessed parts 25A, 25B.

The process gas inlet joint 6B, the inlet opening/closing valve 1B, the process gas inlet joint 6A and the inlet valve 1A are fixed from the upper side of the left side surface of the inlet-side block 41, with a predetermined space kept. The process gas inlet joint 6B and the process gas inlet joint 6A are fixed to the left side surface of the gas inlet-side block 41 by using the fixing bolts 21B, 21A, while the inlet opening/closing valve 1B and the inlet opening/closing valve 1A are also fixed to the left side surface of the gas inlet-side block 41 by a screw-in method.

Further, as shown in FIG. 8, on the gas inlet-side block 41, there are drilled a gas passage 41a connecting the process gas inlet joint 6B with the inlet opening/closing valve 1B, a gas passage 41b communicating the inlet opening/closing valve 1B with the three-way switching opening/closing valve 2B, a gas passage 41c communicating between the three-way switching opening/closing valve 2B and a pressure control device 3B, and a gas passage 41d communicating the three-way switching opening/closing valve 2B with a purge gas inlet 9.

As flow passages for a process gas, etc., flowing from the process gas inlet joint 6A, gas flow passages 41a, 41b, 41c, 41d are drilled individually in a similar manner as described above.

In FIG. 8, reference symbol 24A, 24B denotes a sealing member and 21A, 21B denotes a fixing bolt.

A main body block 45 of the pressure type flow controllers 3A, 3B is obtained by integrating two pairs of main body blocks of the pressure type flow control devices of Embodiment 1 into one block, and its structure is substantially the same as that shown in Embodiment 1 of FIG. 6.

In FIG. 8, reference symbol 36A, 36B, 37A, 37B, 38A, 38B each denotes an individual gas passages, 35A, 35B denotes an orifice, and 24B, 24A denotes a sealing member.

Further, reference symbol 4A, 4B denotes a pressure detector. The pressure detectors 4A, 4B are attached to the pressure type flow controller main body block 45 in the same manner as that described in Embodiment 1 of FIG. 6.

A space between the main body block 45 of the pressure type flow controllers 3A, 3B and the gas inlet-side block 41 is communicated via the pressure type flow controller inlet block 46. The pressure type flow controller inlet block 46 is substantially the same in constitution to the inlet block 15A of Embodiment 1 except that the gas distribution passages 46a, 46b are provided in two and that the pressure type flow controller 3A is fixed to the inlet-side block 41 by using four cap bolts 50, 50 which oppose each other (refer to FIG. 7).

A pressure type flow controller outlet block 47 is fixed airtight on the gas outlet side of the pressure type flow controller main body block 45. The pressure type flow controller outlet block 47 is adapted so as to couple airtight a first block body 47' to a second block body 47" via sealing members 24A, 24B by using a fixing bolt 65 (refer to FIG. 11). The pressure type flow controller outlet block 47 functions to couple the pressure type flow controller main body block 45 to the gas outlet-side block 13, as with the outlet block 16A of Embodiment 1. This is the same as that of the pressure type flow controller outlet block 16A of Embodiment 1 (refer to FIG. 6), however, except that two gas passages 47a, 47b are drilled on the pressure type flow controller outlet block 47 and that the pressure type flow controller 3B is fixed to the gas outlet-side block 42 by using four cap bolts 50, 50 positioned so as to be opposed to each other (refer to FIG. 7 and FIG. 8). As a matter of course, it is acceptable that the pressure type flow controller outlet block 47 is not divided into a first block body 47' and a second block body 47" but formed in an integrated manner.

The second block body 47" of the pressure type flow controller outlet block 47 is connected and fixed airtight to an outlet block 42 of a process gas. Further, the outlet block 42 of the process gas is formed into a short rectangular column block, and outlet opening/closing valves 5A, 5B are screwed and fixed on an outer side surface thereof in a horizontal direction as shown in FIG. 8 and FIG. 9.

Valve chamber recessed parts 25A, 25B which form the outlet opening/closing valves 5A, 5B are formed on a side surface of the outlet block 42 of the process gas. Gas passages 42a, 42b, 42c for gas distribution from the pressure type flow controller outlet block 47 are also installed thereon.

The purge gas passage block 43 is a long/narrow rectangular column-shaped member with rectangular column-shaped height dimension H' on which a purge gas passage 9 is drilled in a direction of height H'.

In a similar manner, the process gas passage block 44 is a long/narrow rectangular column-shaped member with rectangular column-shaped height dimension H' on which a process gas passage 10 is drilled in a direction of length (height H').

The purge gas passage block 43 and the process gas passage block 44 function to couple and fix airtight and individually eight inlet-side blocks 41 and eight outlet-side blocks 42 stacked in a layered manner in a direction of height H. Two fixing bolts 21A, 21B are used to fix the blocks 41, 42 respectively to the purge gas passage block 43 and the process gas passage block 44.

That is, in Embodiment 2, the gas inlet-side block 41 and the gas outlet-side block 42 are divided into short rectangular column blocks and therefore are different in shape from the long inlet-side block 12 and outlet-side block 13 with length dimension H' in a height direction in Embodiment 1.

Figure 11:
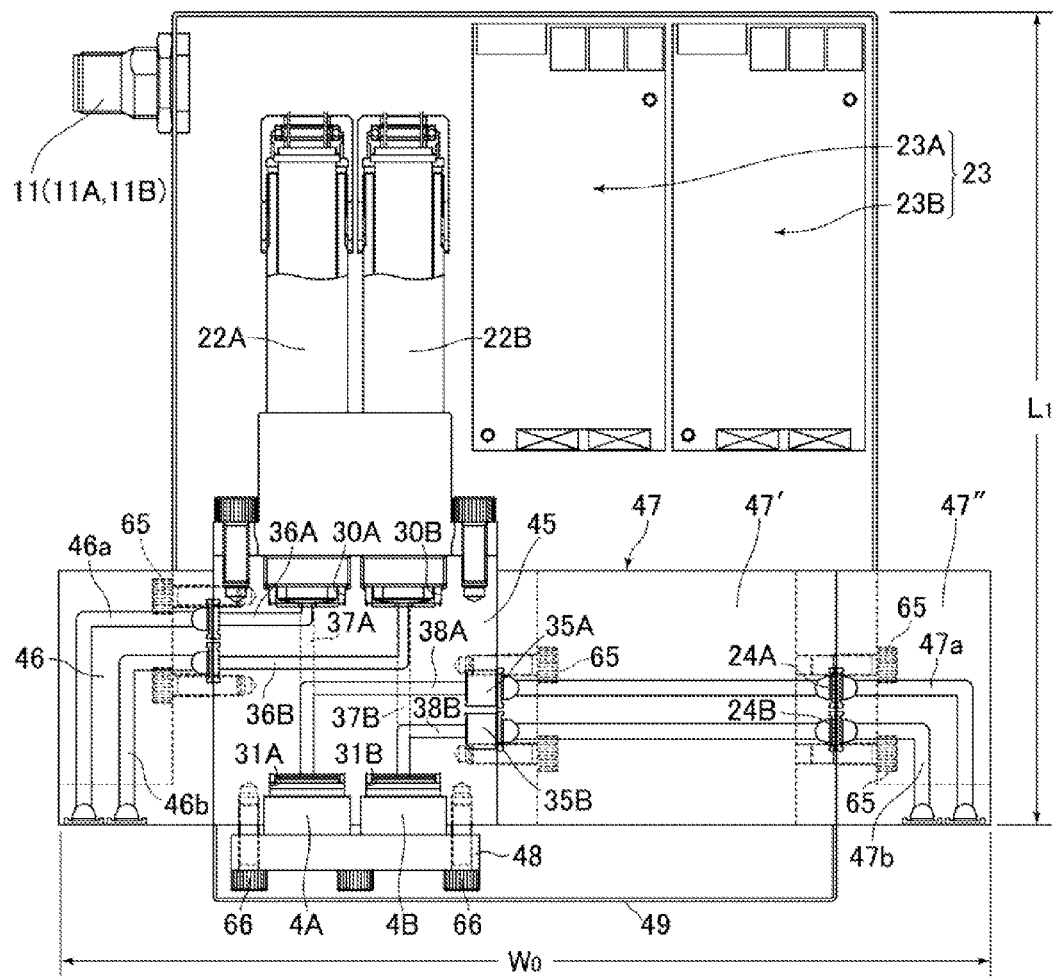
FIG. 11 is a transverse sectional schematic drawing which shows a pressure type flow control device of Example 2 used in Embodiment 2 of the invention of the present application.

As shown in FIG. 7 to FIG. 10 (Example 1), FIG. 11 (Example 2), FIG. 16 (Example 3) and FIG. 17 (Example 4), Embodiment 2 is adapted so that two gas supply lines are combined to give eight units, which are individually fixed to the pressure type flow controller inlet block 46 and the pressure type flow controller outlet block 47 by using four cap bolts 50, 50 arranged so as to oppose each other. One unit is fastened and fixed by eight cap bolts 50.

In the integrated type gas supplying apparatus of Embodiment 2 as well, the gas supplying apparatus is placed horizontally at a ceiling part etc., of semiconductor manufacturing equipment, by which various devices can be replaced and repaired etc., easily by removing the fixing bolts 21A, 21B and the cap bolts 50, 50 from a side surface side of the integrated type gas supplying apparatus.

Example 2

Next, a description will be given of the pressure type flow control device 3 of Example 2 used in Embodiment 2 of the present invention.

FIG. 11 to FIG. 15 show a pressure type flow control device 3 of Example 2 used in Embodiment 2. The pressure type flow control device 3 of Example 2 is substantially the same in structure to the pressure type flow control device 3 shown previously as Example 1 in FIG. 7 and FIG. 8 except that control circuits 23A, 23B of the pressure type flow control device 3 equipped with two piezoelectric element drive units 22A, 22B are collectively formed on one substrate and arranged in parallel laterally at piezoelectric element drive units 22A, 22B, when viewed from above.

That is, the flow controller 3 is given as a pressure type flow controller which uses a piezoelectric element driving control valve. These two piezoelectric element driving control valves 22A, 22B are arrayed in parallel horizontally in a direction of width W when viewed from above, and a substrate which forms the control circuits 2A, 2B of the two pressure type flow controllers 3A, 3B is horizontally arrayed on a lateral side of one of the piezoelectric element driving control valves.

It is noted that in FIG. 11 to FIG. 15, the same portions and members as those of FIG. 7 and FIG. 8 are given the same reference symbols.

Further, in FIG. 11 to FIG. 15, reference symbol 65, 66 denotes a fixing bolt and 67 denotes a switch and a display plate, etc. Input/output connecting tools 11 to the control circuits 23A, 23B are collectively placed at one site.

In the pressure type flow control device 3 of this Example 2, the control circuits 23A, 23B are arrayed and installed as shown in FIG. 11, by which the pressure type flow control device 3 part can be reduced to 184 mm or less in width Wo, 175 mm or less in depth L1 and 21 mm or less in thickness Do. Thus, the gas supplying apparatus can be further downsized.

Example 3

FIG. 16 is a transverse sectional view which shows a pressure type flow control device 3 of Example 3 used in Embodiment 2 of the present invention and substantially the same in constitution to Example 2 shown in FIG. 11 except for the following points. That is, the points are different from Example 2 shown in FIG. 11 that: a pressure detector 4A' for detecting a gas pressure on a secondary side (downstream side) of an orifice 35A is installed on the front surface side of an outlet block 47 of the pressure type flow controller 3, a pressure detector 4B' for detecting a gas pressure on a secondary side (downstream side) of an orifice 35B is installed on the back surface side of the outlet block 47 of the pressure type flow controller 3, and gas flow passages 52a, 52b for detecting a pressure are installed.

The flow controller 3 is, as with Example 2, a pressure type flow controller which uses piezoelectric element driving control valves 2A, 2B. These two piezoelectric element driving control valves 2A, 2B are arrayed horizontally in parallel in a direction of width W, when viewed from above, and a substrate of the control circuit 23 forming the control circuits 2A, 2B of the two pressure type flow controllers is horizontally arranged on a lateral side of one of the piezoelectric element driving control valves.

At the first block body 47' part of the outlet block 47, attachment recessed parts 31a, 31a of second pressure detectors 4A', 4B' are installed so as to oppose each other at the front surface side and at the back surface side thereof. Further, at the part thereof, there are installed an attachment recessed part 31a of one of the second pressure detector, a gas passage 47a communicating between a gas passage 38A of the main body block 45 and a gas passage 42a of the outlet block 42, and a gas passage 52a communicating between a gas passage 47a and the attachment recessed part 31a of one of the second pressure detector. In a similar manner, at the first block body 47' part of the outlet block 47, there are installed an attachment recessed part 31a of the other second pressure detector, a gas passage 47b communicating between a gas passage 38B of the main body block 45 and a gas passage 42b of the outlet-side block 42, and a gas passage 52b communicating between the attachment recessed parts 31a of the other of the second pressure detector and the gas passage 47b.

It is noted that in FIG. 16, reference symbol 31a, 31b denotes a pressure detector attachment recessed part, 4A', 4B' denotes a pressure detector, and 52a, 52b, 53a, 53b, 54b, 54a denotes a gas passage.

Further, in Example 3 of FIG. 16 as well, the same portions and members as those of the pressure type flow controller 3 of Example 1 and Example 2 are given the same reference symbols.

Example 3 is characterized in that since the pressure detectors 4A', 4B' are installed on the downstream side of orifices 35A, 35B, pressure/flow rate control can be attained based on so-called differential pressure, even if a gas flow which is distributed through the orifices is a non-critical state gas flow.

Example 4

FIG. 17 is a transverse sectional view which shows a pressure type flow control device 3 of Example 4 used in Embodiment 2 of the present invention. The control device 3 is different from the pressure type flow control device 3 of Example 1 to Example 3 in that a control circuit 23 is arranged by being divided into three sites, and switching valves 56A, 56B are installed on each gas supply line, thereby supplying a gas through low flow rate orifices 35A, 35B or low flow rate orifices 35A, 35B and high flow rate orifices 55A, 55B.

That is, in Example 4, the flow controller 3 is given as a pressure type flow controller which uses piezoelectric element driving control valves 2A, 2B, and the two piezoelectric element driving control valves 2A, 2B are arrayed in parallel horizontally in a direction of width W, when viewed from above, and a substrate of the control circuit 23 forming control circuits 2A, 2B of the two pressure type flow controllers is horizontally arranged on a lateral side of one of the piezoelectric element driving control valves.

On the other hand, a main body block 45 of the flow controller 3 is adapted so that valve chamber recessed parts 25A, 25B of two piezoelectric element driving control valves and valve chamber recessed parts 59A, 59B of two switching valves are installed on the front surface side of a rectangular column-shaped main body block 45 and two pressure detector attachment recessed parts 31A, 31B are installed on a bottom surface side of the main body block 45.

Further, the main body block 45 of the flow controller 3 is formed with gas passages 37A, 37B communicating between the individual valve chamber recessed parts 25A, 25B and the pressure detector attachment recessed parts 31A, 31B, gas passages 36A, 36B communicating between the individual valve chamber recessed parts 25A, 25B and the flow controller inlet block 46, gas passages 38A, 38B communicating between the individual pressure detector attachment recessed parts 31A, 31B and the flow controller outlet block 47, orifices 35A, 35B installed between the individual gas passages 38A, 38B, gas passages 53a, 53b communicating between the valve chamber recessed part 59A, 59B of the individual switching valves and the individual gas passages 38A, 38B, and gas passages 54a, 54b communicating between the individual valve chamber recessed parts 59A, 59B of the individual switching valves and the flow controller outlet block 47. Orifices 55A, 55B are installed at outlet side ends of the gas passages 54a, 54b.

In addition, the flow controller outlet block 47 is provided with a gas passage 47a communicating the gas passage 38A of the main body block 45 with the gas passage 42a of the gas outlet-side block 42 and a gas passage 47b communicating between the gas passage 38B of the main body block 45 and the gas passage 42b of the gas outlet-side block 42 and also provided with a gas passage 62a communicating between the gas passage 54a of the main body block 45 and the gas passage 47a and a gas passage 62b communicating the gas passage 54b of the main body block 45 with the gas passage 47b.

In FIG. 17, reference symbol 55A, 55B denotes an orifice relatively large in diameter for controlling a high flow rate, 56A, 56B denotes a flow-rate controlling switching valve, 57A, 57B denotes a limit switch, 58A, 58B denotes a position adjusting mechanism of limit switch, 59A, 59B denotes a valve chamber recessed part of switching valve, 60A, 60B denotes an operational air supplying mechanism, 61A, 61B denotes an air flow control valve, and 63A, 63B denotes an air supply port.

Operational air is fed to the switching valves 56A, 56B from the air supply ports 63A, 63B through the air flow control valves 61A, 61B, by which the switching valves 56A, 56B are controlled for opening and closing. Then, an operation state of the switching valves 56A, 56B is transmitted via the limit switches 57A, 58B to outside. It is noted that relative positions of the limit switches 57A, 57B with respect to driving portions (not illustrated) of the switching valves 56A, 56B can be adjusted by the position adjusting mechanisms 58A, 58B.

More specifically, in controlling a low flow rate gas, the switching valves 56A, 56B are kept closed. As a result, a gas to be supplied is controlled for its flow rate by the orifices 35A, 35B which are relatively small in diameter and supplied to a process chamber (not illustrated).

Further, in controlling a high flow rate gas, the switching valves 56A, 56B are kept open. As a result, a gas to be supplied is controlled for its flow rate by the orifices 55A, 55B which are relatively large in diameter and supplied to a process chamber (not illustrated).

Where the pressure type flow control device 3 of Example 4 is used, it is possible to arbitrarily change a range of controlled flow rate of gas depending on a flow rate of the gas supplied. Thus, the gas can be controlled for its flow rate at higher accuracy.

Embodiment 3

Figure 18:
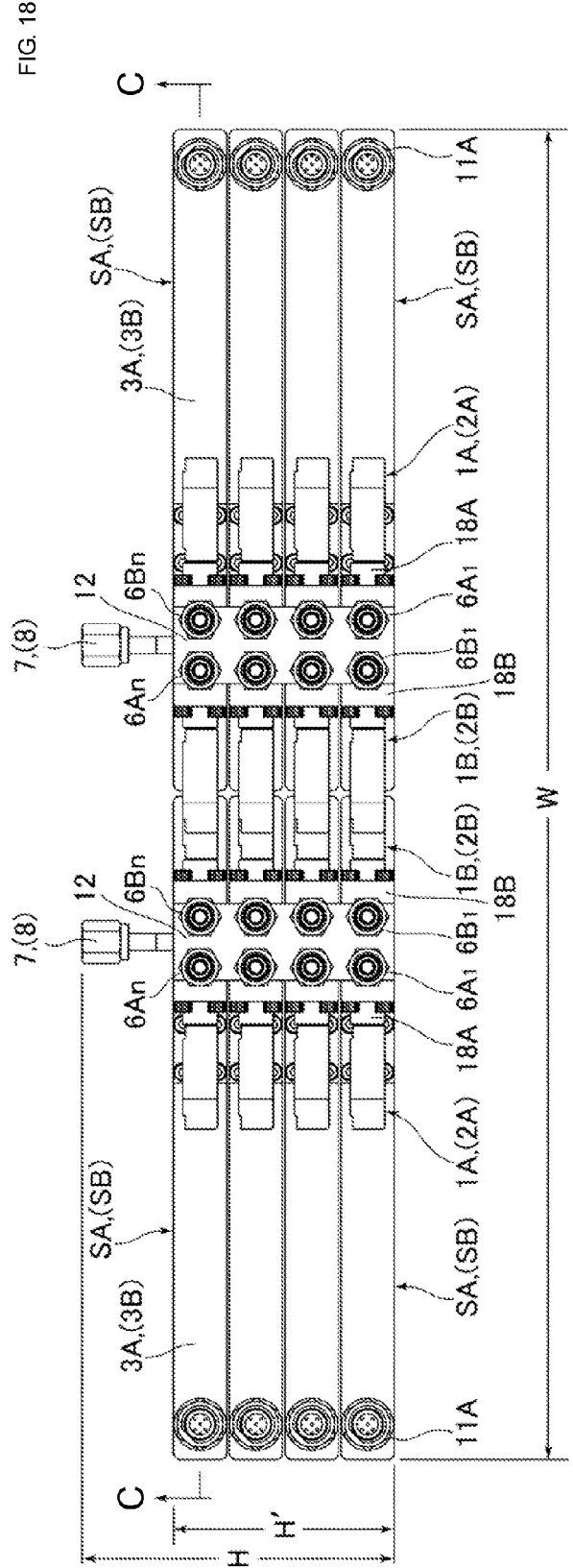
FIG. 18 is a front elevational view which shows an integrated type gas supplying apparatus for semiconductor manufacturing equipment of Embodiment 3 in the present invention.
Figure 19:
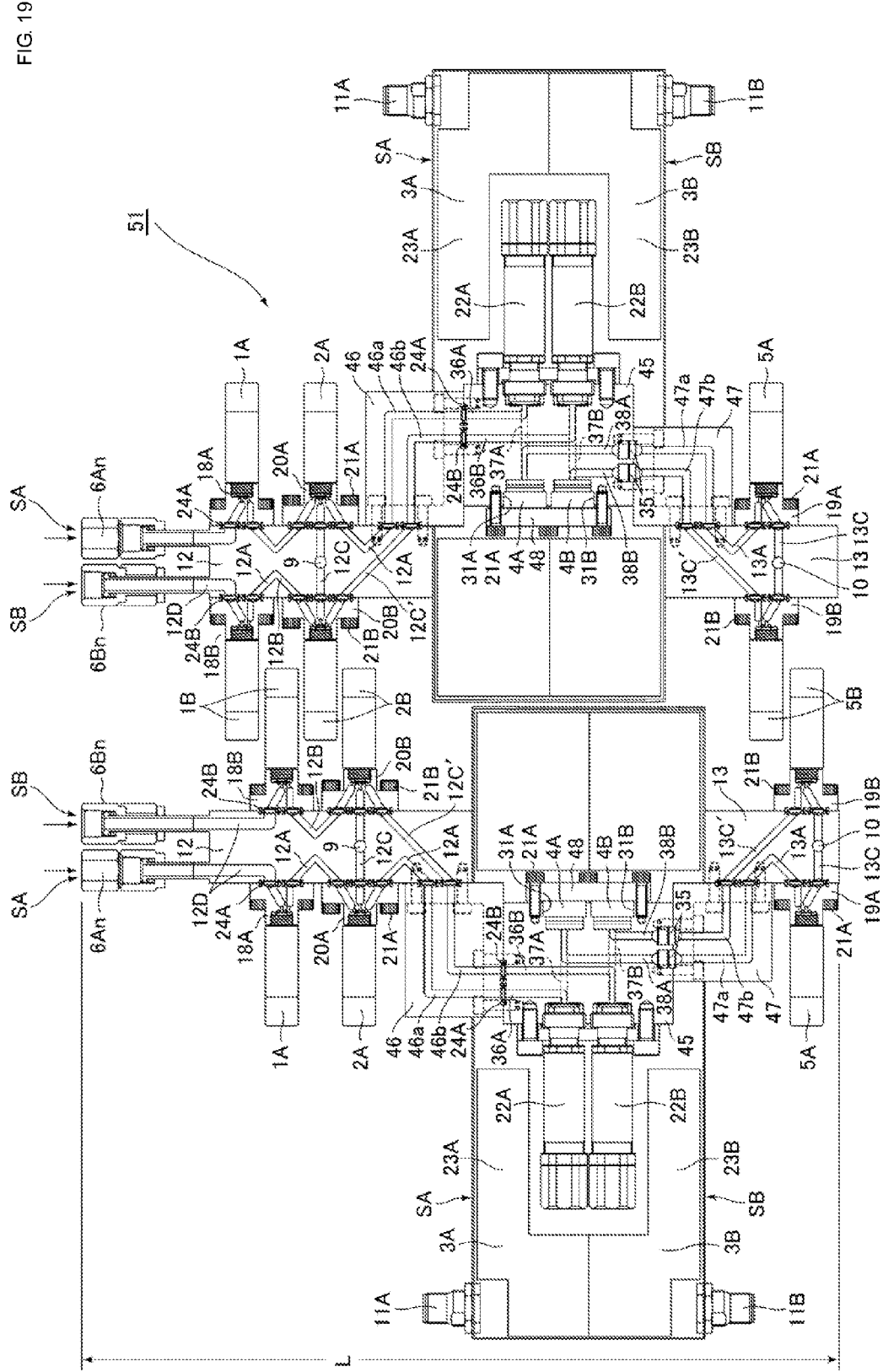
FIG. 19 is a cross sectional schematic drawing which enlarges a part taken along a line C to C in FIG. 18.
Figure 22:
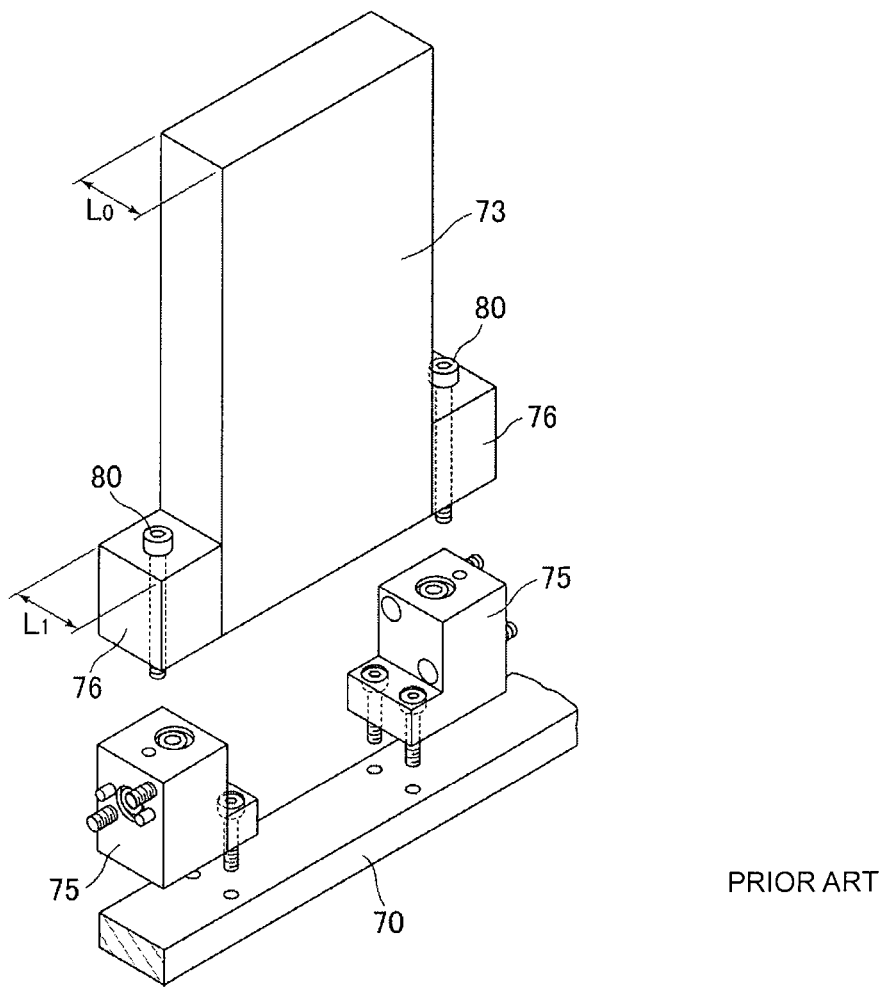
FIG. 22 is a perspective view which shows one example of attachment structure of a conventional flow control device (Japanese Published Unexamined Patent Application No. 2008-298180).

Next, FIG. 18 to FIG. 20 show Embodiment 3 of the present invention. A description will be given of Embodiment 3 of the present invention with reference to FIG. 18 to FIG. 20.

FIG. 18 is a front elevational view which shows an integrated type gas supplying apparatus of Embodiment 3. FIG. 19 is a sectional view taken along the line C to C in FIG. 18 (transverse sectional view) and FIG. 20 is a right side view of FIG. 18.

In FIG. 18 to FIG. 20, the same portions and members as those of FIG. 1 to FIG. 17 are given the same reference symbols. In the integrated type gas supplying apparatus of Embodiment 3, a side where the purge gas inlet joint 7 and the process gas outlet joint 8 of FIG. 18 are installed is referred to as an upper side of the integrated type gas supplying apparatus.

Further, in the integrated type gas supplying apparatus of this Embodiment 3, the width W, depth L and height H of the gas supplying apparatus are as per described in FIG. 18 to FIG. 20.

That is, as shown in FIG. 19, the integrated type gas supplying apparatus of Embodiment 3 is adapted so that integrated type gas supplying apparatuses, each of which has two gas supply lines SA, SB by combining the gas inlet-side block 12 and the gas outlet-side block 13 constituted in Embodiment 1 (refer to FIG. 3) with the pressure type flow controller main body block 45 of Embodiment 2 (refer to FIG. 11 and FIG. 8), are allowed to oppose each other, then, combined and fixed in a line (horizontally) in a width W direction, respectively, thereby giving a unit body 51 equipped with four gas supply lines SA, SA, SB, SB, and these unit bodies 51 are stacked at four stages in a direction of height H and supported and fixed to each other.

With reference to FIG. 18 to FIG. 20, reference symbol 1A, 1B denotes an inlet-side opening/closing valve, 2A, 2B denotes a three-way switching opening/closing valve, 3A, 3B denotes a flow controller (FCS-A, FCS-B), 4A, 4B denotes a pressure detector, 5A, 5B denotes an outlet opening/closing valve, 6A, 6B denotes a process gas inlet joint, 7 denotes a purge gas inlet joint, 8 denotes a process gas outlet joint, 9 denotes a purge gas passage, 10 denotes a process gas passage, and 11A, 11B denotes an input/output connecting tool (cable connector).

Further, in FIG. 18 to FIG. 20, reference symbol 12 denotes a rectangular column-shaped gas inlet-side block, 12A, 12B denotes a V-shaped gas passage, 12C, 12C' denotes a gas passage, 13 denotes a rectangular column-shaped gas outlet-side block, 13A denotes a V-shaped gas passage, 13C, 13C' denotes a gas passage, 45 denotes a flow controller main body block, 46 denotes a flow controller inlet block, 47 denotes a flow controller outlet block, 48 denotes a pressure detector attachment block, 18A, 18B denotes an inlet opening/closing valve main body block, 19A, 19B denote an outlet opening/closing valve main body block, 20A, 20B denotes a three-way opening/closing valve main body block, and 21A, 21B denotes a fixing bolt. The flow controllers 3A, 3B are provided with piezoelectric element driving bodies 22A, 22B and control circuits 23A, 23B.

It is noted that each of the gas inlet-side block 12 and the gas outlet-side block 13 is provided with height H' when a plurality of unit bodies 51, for example, four units are supported and fixed in a layered manner.

The main body block 45 of the pressure type flow controllers 3A, 3B is obtained by integrating two pairs of main body blocks of the pressure type flow control devices of Embodiment 1 into one block and substantially the same in constitution to that described in Embodiment 2 shown in FIG. 8 and FIG. 11.

In FIG. 19, reference symbol 36A, 36B, 37A, 37B, 38A, 38B each denotes a gas passage, 35 denotes an orifice, and 24B, 24A denotes a sealing member.

Further, reference symbol 4A, 4B denotes a pressure detector. These pressure detectors 4A, 4B are attached to the main body block 45 of the pressure type flow controller in the same way as that of Embodiment 2 shown in FIG. 8 and FIG. 11.

A space between the main body block 45 of the pressure type flow controllers 3A, 3B and the gas inlet-side block 12 is communicated via the pressure type flow controller inlet block 46. Further, the pressure type flow controller inlet block 46 is constituted in the same manner as the inlet block 46 of Embodiment 2, and gas distribution passages 46a, 46b are installed.

An outlet block 47 is fixed airtight to a gas outlet side of the pressure type flow controller main body block 45, and two gas passages 47a, 47b are drilled on the pressure type flow controller outlet block 47. The pressure type flow controller outlet block 47 is the same in constitution and function to that of Embodiment 2.

Figure 12:
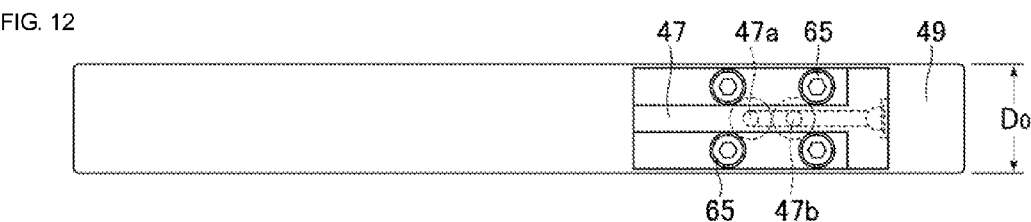
FIG. 12 is a right side view of FIG. 11.
Figure 13:
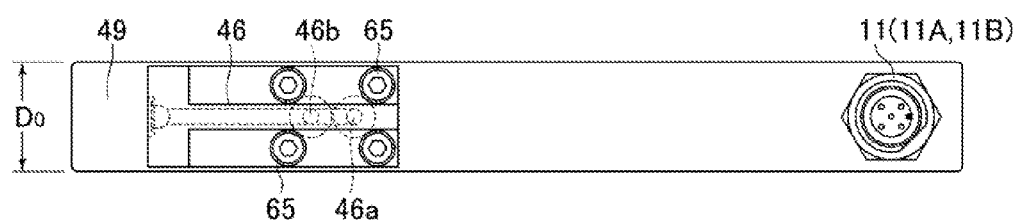
FIG. 13 is a left side view of FIG. 11.
Figure 14:
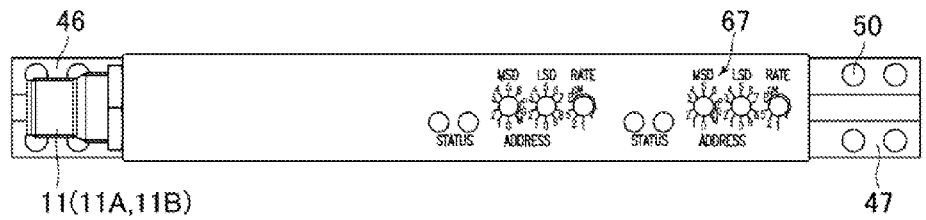
FIG. 14 is a front elevational view of FIG. 11.
Figure 15:
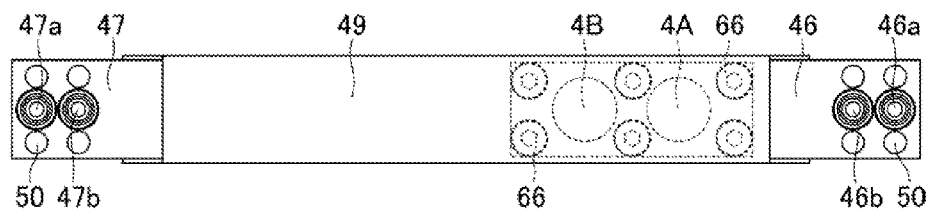
FIG. 15 is a rear view of FIG. 11.

The pressure type flow controller outlet block 47 is connected and fixed airtight to the outlet-side block 13. The outlet-side block 13 is formed into a rectangular column block with length H' in a height direction. As shown in FIG. 12, outlet-side opening/closing valves 5A, 5B are screwed and fixed to both side surfaces thereof in a horizontal direction so as to oppose each other.

As described above, two gas supply lines SA, SB made by combining the gas inlet-side block 12, the pressure detector inlet block 46, the pressure type flow controller main body block 45, the pressure type flow controller outlet block 47, the inlet-side opening/closing valves 1A, 1B, the three-way switching opening/closing valves 2A, 2B, the flow controllers 3A, 3B, the pressure detectors 4A, 4B, the gas outlet-side block 13, the outlet opening/closing valves 5A, 5B, etc., are stacked at four stages and fixed in a height direction of the gas inlet-side block 12 and the gas outlet-side block 13, thereby giving two pairs of integrated type gas supplying apparatuses. As shown in FIG. 19, they are combined and fixed horizontally in a line in a width W direction in a state of opposing each other. Thereby, an integrated type gas supplying apparatus is formed, in which unit bodies 51 are stacked in a layered manner and fixed at four stages, each of which is equipped with four gas supply lines SA, SB.

Two integrated type gas supplying apparatuses which are allowed to oppose each other may be fixed by any mechanism. This Embodiment 3 is adapted so that a space between both gas inlet-side blocks 12, 12 is fixed by a coupling member (not illustrated) by which these two integrated type gas supplying apparatuses are fixed to each other.

Further, the two integrated type gas supplying apparatuses can be fixed by coupling the process gas outlet joints 8 coming out from the gas outlet-side block 13 together or by forming a flange-like joint on each of the gas outlet-side blocks 13, 13 to couple both the gas outlet-side blocks 13, 13.

In fixing two integrated type gas supplying apparatuses, as shown in FIG. 19, it is desirable that both the integrated type gas supplying apparatuses which are to be opposed to each other are deviated in a direction of depth L, by which opening/closing valves thereof 1B, 2B, 5B are overlapped in a width W direction to shorten the width W of each of the integrated type gas supplying apparatuses.

The unit bodies 51, each of which is equipped with four gas supply lines SA, SB, can be stacked by any number of stages as shown in FIG. 20. For example, four units are stacked and fixed in a direction of height H, thereby forming an integrated type gas supplying apparatus which is equipped with a total of 16 gas supply lines S composed of four stages of unit bodies 51.

INDUSTRIAL APPLICABILITY

The present invention is applicable not only to a gas supplying apparatus for semiconductor manufacturing equipment but also to a gas supplying apparatus for various types of chemical equipment, etc.

DESCRIPTION OF REFERENCE SYMBOLS

W: width dimension of gas supplying apparatus (integrated type)
L: depth dimension of gas supplying apparatus (integrated type)
H: height dimension of gas supplying apparatus (integrated type)
H': dimension in height direction
S: gas supply line
φ: center line of gas supplying apparatus (integrated type) in width direction
1, 1A, 1B: inlet opening/closing valve
2, 2A, 2B: three-way switching opening/closing valve
3, 3A, 3B: pressure type flow controller
4, 4A, 4B: pressure detector
4A', 4B': pressure detector
5, 5A, 5B: outlet opening/closing valve
6, 6A1 to 6A8: process gas inlet joint (integrated type)
6, 6B1 to 6B8: process gas inlet joint
7: purge gas inlet joint
8: process gas outlet joint
9: purge gas passage
10: process gas passage
11, 11A1, 11A2: input/output connecting tool (cable connector)
11, 11B1, 11B2: input/output connecting tool (cable connector)
12: gas inlet-side block
12A, 12B: V-shaped gas passage
12C, 12B: gas passage
13: gas outlet-side block
13A, 13B: V-shaped gas passage
13C: gas passage
14, 14A, 14B: pressure type flow controller main body block
15, 15A, 15B: pressure type flow controller inlet block
16, 16A, 16B: pressure type flow controller outlet block
17, 17A, 17B: pressure detector attachment block
18, 18A, 18B: inlet opening/closing valve main body block
19, 19A, 19B: outlet opening/closing valve main body block
20, 20A, 20B: three-way opening/closing valve main body block
21, 21A, 21B: fixing bolt
22, 22A, 22B: piezoelectric element drive unit
23, 23A1, 23A2: control circuit
23, 23B1, 23B2: control circuit
24, 24A, 24B: sealing member
25, 25A, 25B: valve chamber recessed part
26, 26A, 26B: valve seat
27, 27A, 27B: metal diaphragm (valve body)
28, 28A, 28B: diaphragm presser
29, 29A, 29B: pressing piston
30, 30A: valve chamber recessed part
31A, 31B: pressure detector attachment recessed part (for pressure detector 4A, 4B)
31a, 31b: pressure detector attachment recessed part (for pressure detector 4A', 4B')
32, 32A: diaphragm
33, 33A: diaphragm presser
34, 34A: hood
35: orifice
36, 36A: gas passage
37, 37A: gas passage
38, 38A: gas passage
39: valve rod
40: cover body
41: gas inlet-side block
41a, 41b, 41c, 41d: gas flow passage
42: gas outlet-side block
42a, 42b: gas passage
43: purge gas passage block
44: process gas outlet block
45: pressure type flow controller main body block
46: pressure type flow controller inlet block
46a, 46b, 42c: gas passage
47: pressure type flow controller outlet block
47a, 47b: gas passage
48: pressure detector attachment block
49: pressure detector attachment block cover body
50: fixing cap bolt
51: unit body
52a, 52b: gas passage
53a, 53b: gas passage
54a, 54b: gas passage
55, 55A, 55B: orifice (for large diameter)
56, 56A, 56B: switching valve
57, 57A, 57B: limit switch
58, 58A, 58B: position adjusting device of limit switch
59, 59A, 59B: valve chamber recessed part of switching valve
60, 60A, 60B: operational air supplying mechanism
61, 61A, 61B: air flow control valve
62, 62a, 62b: gas passage
63, 63A, 63B: air supply port
65: fixing bolt
66: fixing bolt
67: switches

What is claimed is:

1. A gas supplying apparatus, comprising:
at least first and second gas supply lines, having a common gas inlet side block and a common gas outlet side block;
a fluid control device provided for each of the first and second gas supply line, each fluid control device including at least one flow controller having an inlet-side block and an outlet side block;
wherein the inlet-side block of the flow controller for the first gas supply line and the inlet-side block of the flow controller for the second gas supply line are connected to the common gas inlet side block so as to oppose each other, interposing the common gas inlet side block there between; and
wherein the outlet-side block of the flow controller for the first gas supply line and the outlet-side block of the flow controller for the second gas supply line are connected to the common gas outlet side block so as to oppose each other, interposing the common gas outlet side block there between.

2. The gas supplying apparatus according to claim 1 further comprising:
a purge gas passage communicating between the first and second gas supply lines provided in the common gas inlet side block, and a process gas passage communicating between the first and second gas supply lines provided in the common gas outlet side block.

3. The gas supplying apparatus according to claim 1, wherein each of the plurality of fluid control devices includes an inlet opening/closing valve, a three-way switching opening/closing valve, the at least one flow controller and an outlet opening/closing valve.

4. A gas supplying apparatus comprising a plurality of gas supply lines, including a first gas supply line and a second gas supply line in parallel, each gas supply line having a process gas distribution path comprising, an inlet opening/closing valve, a three-way switching opening/closing valve, a flow controller, an outlet opening/closing valve, and a purge gas distribution path comprising the three-way switching opening/closing valve, wherein a common gas inlet-side block and a common gas outlet-side block, each having a shape of a long/narrow rectangular column with height H', are arrayed in a direction of depth L for the first gas supply line and the second gas supply line, wherein the inlet opening/closing valve, the three-way switching opening/closing valve, and an inlet block of the flow controller for the first gas supply line are fixed on one side surface of the common gas inlet-side block, and an outlet block of the flow controller and the outlet opening/closing valve for the first gas supply line are fixed on one side surface of the common gas outlet-side block, wherein the second gas supply line is formed so as to oppose the first gas supply line on an other side surface of the common gas inlet-side block and that of the gas outlet-side block, and wherein the inlet opening/closing valve, the three-way switching opening/closing valve and an inlet block of the flow controller for the second gas supply line are fixed on the other side surface of the common gas inlet-side block, and an outlet block of the flow controller and the outlet opening/closing valve for the second gas supply line are fixed on the other side surface of the common gas outlet-side block.

5. The gas supplying apparatus according to claim 4, wherein a plurality of a pair of the first and second gas supply lines, opposing to each other, are disposed in parallel in a direction of height H of the common gas inlet-side block and that of the common gas outlet-side block.

6. The gas supplying apparatus according to claim 4,
wherein the common gas inlet-side block is formed with a purge gas passage extending in a direction of height H,
wherein, on both sides of the gas inlet-side block, a first gas passage is formed communicating between a process gas inlet joint and the inlet opening/closing valve, a second gas passage is formed communicating between the inlet opening/closing valve and the three-way switching opening/closing valve, a third gas passage is formed communicating between the three-way switching opening/closing valve and the inlet block of the flow controller, and a fourth gas passage is formed communicating between the purge gas passage and the three-way switching opening/closing valve so as to oppose each other.

7. The gas supplying apparatus according to claim 4,
wherein a process gas passage is formed which extends in a direction of height H of the common gas outlet-side block, and
wherein, on each of the one and the other sides of the common gas outlet-side block, a first gas passage is formed communicating between the outlet block of the flow controller and the outlet opening/closing valve, and a second gas passage is formed communicating between the outlet opening/closing valve and the process gas passage so as to oppose each other.

8. The gas supplying apparatus according to claim 4, wherein the flow controller is a pressure type flow controller having a piezoelectric element driving control valve.

9. The gas supplying apparatus according to claim 4, wherein valve chamber recessed parts for the inlet opening/closing valve, the three-way switching opening/closing valve and the outlet opening/closing valve are formed at the gas inlet-side block and the gas outlet-side block.

10. The gas supplying apparatus according to claim 4,
wherein the flow controller comprises a rectangular main body block between the inlet block and the outlet block, wherein the main body block of the flow controller includes a valve chamber recessed part of a piezoelectric element driving control valve provided on a first side surface of the main block body, a pressure detector attachment recessed part provided on the a second side surface of the main body block body, a first gas passage communicating between the valve chamber recessed part and the pressure detector attachment recessed part, a second gas passage communicating between the valve chamber recessed part and the inlet block, a third gas passage communicating between the pressure detector attachment recessed part and the outlet block, and an orifice provided on the third gas passage communicating between the pressure detector attachment recessed part and the outlet block.

11. The gas supplying apparatus according to claim 4,
wherein the flow controller has a main body block equipped with the inlet block and the outlet block,
wherein the main body block of each flow controller is structured so that two valve chamber recessed parts of two piezoelectric element driving control valves are provided in parallel on a front surface side of the main block body,
wherein two pressure detector attachment recessed parts are provided in parallel at a back surface side of the main block body, and
wherein first gas passages are provided communicating between each of the valve chamber recessed parts and each of the pressure detector attachment recessed parts,
wherein second gas passages are provided communicating between each of the valve chamber recessed parts and the inlet block,
wherein third gas passages are provided communicating between each of the pressure detector attachment recessed parts and the outlet block, and
wherein orifices are provided on each of the third gas passages communicating between the pressure detector attachment recessed part and the outlet block.

12. The gas supplying apparatus according to claim 11,
wherein the outlet block of the flow controller has gas passages for communicating the third gas passages of the main body block with gas passages of the common gas outlet-side block.

13. The gas supplying apparatus according to claim 12,
wherein the outlet block is formed by coupling a first block body to a second block body.

14. The gas supplying apparatus according to claim 11,
wherein the outlet block includes attachment recessed parts for second pressure detectors.

15. The gas supplying apparatus according to claim 4,
wherein the flow controller includes a main body block equipped with the inlet block and the outlet block,
wherein the main body block of the flow controller includes two valve chamber recessed parts of two piezoelectric element driving control valves and two valve chamber recessed parts of two switching valves,
wherein the two driving control valves and two switching valves are installed in parallel on a front surface side of the main body block,
wherein two pressure detector attachment recessed parts are installed in parallel at a back surface side of the main body block, and wherein first gas passages are provided communicating between the valve chamber recessed parts of each of the piezoelectric element driving control valves and the pressure detector attachment recessed parts, wherein second gas passages are provided communicating between the valve chamber recessed parts and the inlet block, wherein third gas passages are provided communicating between the pressure detector attachment recessed parts and the outlet block, wherein first orifices are provided on the third gas passages, wherein fourth gas passages are provided communicating between the valve chamber recessed parts of the switching valves and the third gas passages, wherein fifth gas passages are provided communicating between the valve chamber recessed parts of the switching valves and the outlet block, and wherein second orifices are provided on the fifth gas passages.

16. The gas supplying apparatus according to claim 15, wherein the outlet block of the flow controller has therein first gas passages communicating between the third gas passages of the main body block and gas passages of the common gas outlet-side block and second gas passages communicating between the fifth gas passage of the main body block and the first gas passage of the outlet block.

\* \* \* \* \*